United States Patent
Spier et al.

(10) Patent No.: US 10,689,285 B2
(45) Date of Patent: Jun. 23, 2020

(54) METHOD FOR LASER-ASSITED SEPARATION OF A PORTION FROM A SHEET-LIKE GLASS OR GLASS CERAMIC ELEMENT

(71) Applicant: SCHOTT AG, Mainz (DE)

(72) Inventors: Martin Spier, Horrweiler (DE); Fabian Wagner, Mainz (DE); Andreas Ortner, Gau-Algesheim (DE); Georg Haselhorst, Schmitten (DE); Volker Plapper, Alzey (DE)

(73) Assignee: SCHOTT AG, Mainz (DE)

( * ) Notice: Subject to any disclaimer, the term of this patent is extended or adjusted under 35 U.S.C. 154(b) by 193 days.

(21) Appl. No.: 15/996,891

(22) Filed: Jun. 4, 2018

(65) Prior Publication Data

US 2018/0297887 A1 Oct. 18, 2018

Related U.S. Application Data

(63) Continuation of application No. PCT/EP2016/079417, filed on Dec. 1, 2016.

(30) Foreign Application Priority Data

Dec. 2, 2015 (DE) .......... 10 2015 120 950

(51) Int. Cl.
*C03B 33/02* (2006.01)
*B23K 26/00* (2014.01)
(Continued)

(52) U.S. Cl.
CPC ........ *C03B 33/0222* (2013.01); *B23K 26/359* (2015.10); *B23K 26/53* (2015.10);
(Continued)

(58) Field of Classification Search
CPC ..... C03B 33/0222; C03B 32/00; C03B 33/04; C03B 32/02; C03B 33/082; C03B 33/091;
(Continued)

(56) References Cited

U.S. PATENT DOCUMENTS

2011/0039356 A1* 2/2011 Ando ................. B32B 38/10
438/16
2012/0077296 A1* 3/2012 Yamada .............. H01L 33/0095
438/33
(Continued)

FOREIGN PATENT DOCUMENTS

DE 102012110971 5/2014
DE 102015111490 1/2017
(Continued)

OTHER PUBLICATIONS

English translation of the Written Opinion of the International Searching Authority dated Mar. 14, 2017 from corresponding International Application No. PCT/EP2016/079417, 6 pages.
(Continued)

*Primary Examiner* — Queenie S Dehghan
(74) *Attorney, Agent, or Firm* — Ohlandt, Greeley, Ruggiero & Perle, L.L.P.

(57) ABSTRACT

A method is provided for separating a portion from a sheet-like glass or glass ceramic element along an intended separation line to divide the element into the portion and a main part. The method includes producing filamentary damages a volume of the glass or glass ceramic element adjacently aligned along the separation line, the filamentary damages are produced by laser pulses of a laser, the glass or glass ceramic element comprises a material that is transparent for the laser pulses; displacing incidence points of the laser pulses on a surface of the glass or glass ceramic element thereof along the separation line; and subjecting the material of the glass or glass ceramic element located in a
(Continued)

region of the portion to a phase transition so that the material contracts to detach the portion from the main part at the adjacently aligned filamentary damages along the separation line, while the main part remains intact as a whole.

20 Claims, 9 Drawing Sheets

(51) Int. Cl.
    *C03B 32/02*     (2006.01)
    *C03B 33/04*     (2006.01)
    *B23K 26/53*     (2014.01)
    *C03B 32/00*     (2006.01)
    *B23K 26/359*     (2014.01)
    *B23K 103/00*     (2006.01)

(52) U.S. Cl.
    CPC .............. *C03B 32/00* (2013.01); *C03B 32/02* (2013.01); *C03B 33/04* (2013.01); *B23K 2103/52* (2018.08); *B23K 2103/54* (2018.08)

(58) Field of Classification Search
    CPC .... C03B 33/102; B23K 26/359; B23K 26/53; B23K 2103/52; B23K 2103/54
    See application file for complete search history.

(56) References Cited

U.S. PATENT DOCUMENTS

| | | | |
|---|---|---|---|
| 2012/0190174 A1* | 7/2012 | Ryu | ...................... B23K 26/032 |
| | | | 219/383 |
| 2015/0136743 A1 | 5/2015 | Hosseini | |
| 2016/0031745 A1 | 2/2016 | Ortner | |
| 2016/0280580 A1 | 9/2016 | Boehme | |
| 2017/0362697 A1* | 12/2017 | Richter | ................... B32B 33/00 |
| 2018/0134606 A1 | 5/2018 | Wagner | |

FOREIGN PATENT DOCUMENTS

| | | |
|---|---|---|
| EP | 2781296 | 9/2014 |
| WO | 2012006736 | 1/2012 |
| WO | 2015075059 | 5/2015 |

OTHER PUBLICATIONS

Bach, "Low Thermal Expansion Glass Ceramics", Springer-Verlag, Second Edition, 2005, 3 pages.
English translation of the International Preliminary Report on Patentability dated Jun. 5, 2018 from corresponding International Application No. PCT/EP2016/079417, 7 pages.
English translation of the International Search Report dated Mar. 14, 2017 from corresponding International Application No. PCT/EP2016/079417, 2 pages.

* cited by examiner

FIG. 8a
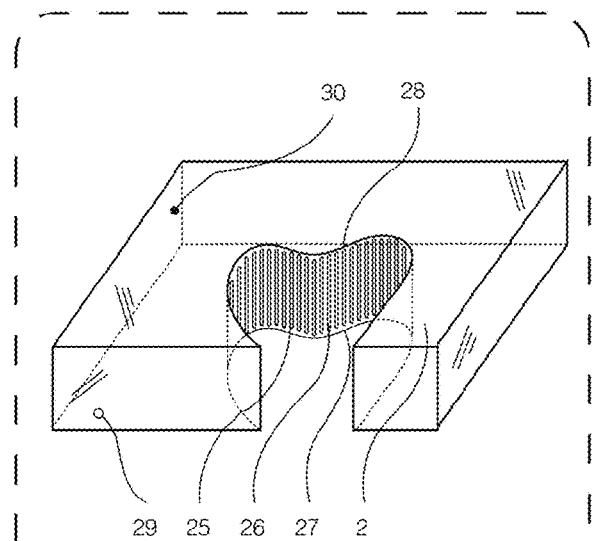
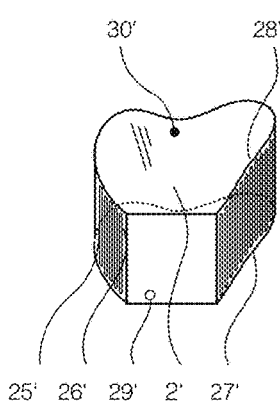
FIG. 8b
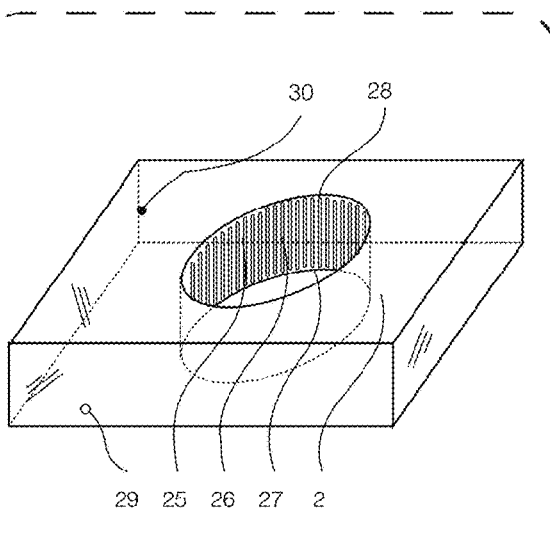
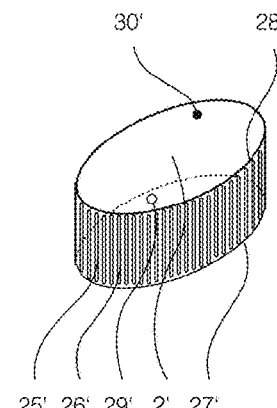

METHOD FOR LASER-ASSITED SEPARATION OF A PORTION FROM A SHEET-LIKE GLASS OR GLASS CERAMIC ELEMENT

CROSS REFERENCE TO RELATED APPLICATIONS

This application is a continuation of International Application No. PCT/EP2016/079417 filed on Dec. 1, 2016, which claims benefit under 35 USC 119 of German Application No. 10 2015 120 950.0 filed Dec. 2, 2015, the entire contents of both of which are incorporated herein by reference.

BACKGROUND

Field of the Invention

The invention relates to a method for laser-assisted separation of a portion from a sheet-like glass or glass ceramic element along an intended separation line which divides the glass or glass ceramic element into the portion to be separated and a remaining main part. The invention furthermore relates to a cooktop comprising a glass or glass ceramic element that is producible as the main part using the method of the invention.

Description of Related Art

From WO 2012/006736 A2 it is known that a pulsed focused laser beam can be used to produce filaments in a transparent substrate, and that a path formed of a plurality of filaments makes it possible to separate the substrate. A filament is produced by a high-energy short laser pulse in this case, and it is assumed that the non-linear optical Kerr effect causes self-focusing of the laser beam, which results in plasma formation.

DE 10 2012 110 971 A1 describes a method for preparing separation of transparent workpieces, in which filamentary structures are produced by ultrashort laser pulses along an intended breaking line, which filamentary structures extend across the workpiece and are aligned next to each other. In a subsequent step, separation of the workpiece is accomplished.

In the case of thin glass or glass ceramic elements and rectilinear separation lines, the separation after laser filamentation is easily feasible. For example, separation can be achieved by exerting a sufficient bending moment. However, separation will be more difficult if the separation line is curved, has several sections at an angle to one another, or even forms a closed line. The latter case is in particular given when an inner cutout (also referred to as inner contour) is to be produced.

One way of separating inner contours from sheet-like substrates can be found in EP 2 781 296 A1. In this case, a laser beam is directed over the substrate and is used to produce a multitude of individual zones of inner damage along a contour line (contour definition step) and along a plurality of, for instance, spiral or V-shaped crack line sections extending from the contour line into the contour to be separated (crack definition step). Subsequently, a material-removing laser beam is directed over the substrate and is used to remove the substrate material across the entire substrate thickness along a removal line extending along but spaced from the contour line and within the contour to be separated (material removal step). Overall, this method is rather complex and cumbersome and therefore should be improved in terms of efficiency. Other drawbacks include the fact that the inner contour is destroyed, which might otherwise be of interest in particular as it exactly fits to the remaining substrate, and also particles and splinters caused by the destructive process and entailing increased cleaning costs.

The method moreover reaches its limits in the case of thick glass or glass ceramic elements, especially those having a thickness of more than 3 millimeters. In the case of thick glasses, the heating of the inner contour as caused during the material removal step may in particular lead to an expansion of the material which is stronger than the desired effect of gap formation, due to gravity-related bulging of the material.

Patent application DE 10 2015 111 490.9 presents a method for laser-assisted separation of a portion from a sheet-like glass element, which is suitable also for thicker glass elements. The glass element is heated in the region of the main part and caused to expand, and/or is cooled in the region of the portion and caused to contract, so that the portion detaches from the main part. However, this method is primarily intended for glass elements and not so much for glass ceramic elements. Moreover, the method should be further improved in particular for materials having a low coefficient of thermal expansion and for separating small portions.

Patent application DE 10 2015 111 490.9 of the same Applicant as the present application is hereby incorporated by reference.

SUMMARY

It is therefore an object of the invention to provide an efficient method which allows to separate portions from sheet-like glass or glass ceramic elements along separation lines that are not straight, especially along strongly curved or even closed-loop separation lines, and in such a manner that both the separated portion and the remaining main part of the glass element are not further damaged.

One aspect of the object includes to provide for separation of even small inner cutouts from thick glass or glass ceramic elements that have a low coefficient of thermal expansion.

Another aspect of the object includes to enable such separation of the portion in a neat, in particular splinter-free manner, and to minimize the risk of detrimental cracking both in the separated portion and in the remaining main portion.

According to the invention, this object is achieved by the subject matter of the independent claims. Advantageous embodiments of the invention are specified in the dependent claims.

The inventive method is adapted for separating a portion from a sheet-like glass or glass ceramic element along an intended separation line which divides the glass or glass ceramic element into the portion to be separated and a remaining main part.

Thus, the intended separation line divides the sheet-like element into two completely delimited sheet-like areas so that the portion can be completely separated from the glass or glass ceramic element along the separation line.

The method according to the invention is based on a generation of filamentary damages in the volume of the glass or glass ceramic element adjacently aligned along the separation line, and on the fact that the damages are produced by laser pulses of a laser, in particular as the laser pulses generate a plasma in the volume of the glass element, the material of the glass or glass ceramic element being transparent for the laser pulses, and by displacing the points of incidence of the laser pulses on the glass or glass ceramic element over the surface thereof along the separation line.

According to the invention, once the filamentary damages adjacently aligned along the separation line have been produced, material of the glass or glass ceramic element located within the region of the portion is subjected to a phase transition and caused to contract so that the portion detaches from the main part at the adjacently aligned filamentary damages along the separation line. In other words, it is possible to cause material that is located in the region of the portion of the glass or glass ceramic element to undergo a phase transition and to decrease in volume, and detachment is achieved in particular as a result of the decrease in volume of the material.

The initiating of the phase transition preferably causes the contraction of the phase-transformed material.

According to a preferred embodiment of the invention it is therefore contemplated that the material of the glass or glass ceramic element which is subjected to a phase transition, transforms into a phase that has a higher atomic packing factor than the initial phase.

Hence, after phase transition, the atoms of the material that undergoes a phase transition are able to arrange within a smaller volume than before. Therefore, the ratio of the volume of the atoms and the volume occupied by the atoms, i.e. the atomic packing factor, or packing efficiency, is increased. That is, the particles of the phase-transformed material are able to reduce the spacing between each other. Thus, the phase-transformed material has a higher density than before.

Particularly preferably, the material of the glass or glass ceramic element which is subjected to a phase transition transforms into a crystal phase. Usually, crystal phases are states with a highest packing efficiency.

It is in particular preferred to convert material into a crystalline phase starting from an amorphous phase. In other words, material which initially is in a metastable state changes into a stable or at least more stable state. For example, amorphous material can be converted into high-quartz solid solution (HQss) and/or into keatite solid solution (Kss).

Typically, within the region of the portion, ceramization of the glass or glass ceramic element is started or continued. This means that amorphous material of the glass or glass ceramic element, which is included finely distributed in the region of the portion, crystallizes. Accordingly, seed crystals are being formed, which grow into crystallites, or existing crystallites are enlarging. In other words, it is possible for the portion to become at least partially ceramized. For example, a finely distributed HQss phase and/or Kss phase may be produced within the region of the portion, for instance it may be intended to transform about 70 percent of the volume of the region being ceramized of the glass or glass ceramic element into crystallites and to leave about 30 percent in an amorphous state.

Ceramic crystallites typically have a negative coefficient of thermal expansion, so that even a temperature-related contraction may be achieved by heating. Due to the negative coefficient of thermal expansion of ceramic crystallites, it is in particular possible to achieve an overall very small or near-zero coefficient of thermal expansion of a ceramized region of the glass or glass ceramic element. Thus, it is possible to provoke a relative contraction of a ceramized substrate region relative to a non-ceramized substrate region, which benefits from increased substrate temperature.

For example it may be intended to convert, through ceramization, a sheet-like glass element consisting of a so-called green glass, that is an amorphous starting material for a ceramization process, into a semi-crystalline state. The ceramized glass thereby typically shrinks by 1 to 2 percent. See, e.g., Bach, Krause (ed.): Low Thermal Expansion Glass Ceramics, Springer-Verlag, 2nd Ed., 2005, page 43, FIG. 2.23.

The materials that are preferably to be processed have a composition which at the stage of green glass production promotes a spatially evenly distributed local liquid-liquid phase separation, in particular droplet formation. Accordingly, the solid glass or glass ceramic element from which a portion is to be separated may already include at least two phases which are preferably both amorphous but differ in terms of their chemical composition. Since it is in particular possible within such droplets to selectively initiate crystallization, this advantageously allows for controlled crystallization.

It may also be contemplated to add impurities to the green glass, as seed forming agents, which will precipitate upon heating to be effective as seed crystals.

In a preferred embodiment of the invention, the material of the glass or glass ceramic element which is subjected to a phase transition is heated to a phase transition temperature to initiate the phase transition. Although it would generally also be possible to change other physical parameters to initiate a phase transition (e.g. pressure), a change in temperature is particularly advantageous because temperature is an intensive state variable that can be readily controlled in practice.

The heating to the phase transition temperature is preferably achieved using electromagnetic radiation, in particular laser radiation, e.g. by a carbon dioxide or diode laser. A diode laser may, for example, be used in the case of volume-dyed glass ceramics such as SCHOTT CERAN®, wherein a wavelength of about 1000 nm and injection of the laser radiation into a volume fraction of 8 to 12 percent is preferred in this case. Depending on the absorption behavior of the materials, other types of lasers may be used as well, such as Nd:YAG lasers (1064 nm), Er:YAG lasers, or HF lasers, or CO lasers (4.8 µm to 8.3 µm), for example in case of high absorption at 2.9 µm or 5.6 µm.

By exposing the material to electromagnetic radiation, it is in particular possible to selectively heat material locally at specific points within the portion to provoke phase transition there. For example, locally limited areas within the volume of the portion may be subjected to an elevated temperature in this way.

This phase transition temperature, which may in particular be referred to as ceramization temperature, may be above the glass transition temperature. In particular, it is furthermore intended that the phase transition temperature is below the melting temperature of the material, in particular well below the latter. In other words, the portion is in particular not heated up to the melting temperature, since this might result in a loss of the edges as defined by the filamentation. Heating up to the melting point may furthermore in particular be unfavorable because a desired ceramization might possibly be undone thereby. The phase transition temperature is preferably at least 50° C., more preferably at least 100° C., yet more preferably at least 150° C. below the melting temperature.

Ceramization of the areas exposed to laser radiation preferably occurs as soon as after less than 80 seconds, preferably after less than 50 seconds, most preferably after less than 20 seconds.

The phase transition temperature mentioned above generally does not refer to the temperature lying exactly on the phase boundary curve in the phase diagram, but rather to a temperature determined in practice, at which the phase transition actually takes place in controllable time scales. More particularly, the phase transition temperature is typically higher than that on the phase boundary curve, so that the seed formation barrier is rapidly overcome.

For efficient processing it is moreover favorable to approximately optimize the seed formation process and subsequent growth of the seeds by selectively controlling the temperature during the laser irradiation.

Therefore, preferably, narrow temperature corridors are covered for optimum seed formation. This applies in particular to materials in which liquid-liquid phase separation (droplet formation) was caused in the stage of green glass production.

Preferably, a very dense distribution of crystallites or crystals is brought about.

It may be contemplated to vary the output power of the laser which heats the material to the phase transition temperature thereof while the point of incidence of the laser is directed over the surface of the glass or glass ceramic element. In particular, the laser output power may be controlled as a function of the local temperature at the intended point of incidence on the surface, in particular the surface temperature. For this purpose, provisions may be made for measuring the temperature of the glass or glass ceramic element. For such a temperature-controlled implementation, in particular a pyrometer or a thermal imaging camera or other imaging temperature measurement techniques for measuring the local temperature may be employed. The target temperatures may in particular be adjusted through a two-step thermal increase.

Provisions may be made for a predefined oscillation of the laser output power, so that an optimum temperature for seed formation and seed growth is adopted multiple times at the respective point of incidence of the laser. This procedure is particularly useful when a $CO_2$ laser is employed. In case of a $CO_2$ laser, absorption of the laser radiation, typically occurs on the surface, and subsequently the substrate is heated across its thickness.

If a volume reduction of material occurs within the region of the portion, in particular a contraction related to phase transition and/or related to the temperature of phase-transformed material, tensile stresses will arise in the material of the portion, which may result in a contraction of the portion. In order to cause the portion to contract, a sufficient amount of material will usually be caused to contract within the region of the portion. For example, it may be intended that a volume fraction of at least 50 percent of the portion is subjected to phase transition. More generally, the percentage degree of ceramization in particular depends on the size and shape of the portion to be separated: With decreasing volume of the portion, the required degree of ceramization increases. Depending on where this material is located within the region of the portion, the portion may contract overall or only locally.

The contraction of the portion may in turn give rise to tensile stresses at the periphery of the portion, in particular along the filamented separation line. Such tensile stresses in the glass or glass ceramic element extending across the perforation can cause cracking between adjacent filamentary damages so that the portion detaches from the main part. The severing or detaching of the portion is also referred to as "cleaving". Cleaving of the portion from the main part may optionally be achieved or promoted by an additional so-called cleaving step, as will be described further below.

Anyhow, the contraction of material according to the invention within the region of the portion, in particular as related to phase transition, causes the portion to contract at least in areas thereof. The contraction of material within the region of the portion therefore causes contraction of the portion itself at least locally. The portion will thus experience shrinkage, at least locally. It may be intended that the portion shrinks by at least 1 percent, preferably by at least 2 percent, more preferably by at least 3 percent.

If contraction of material within the region of the portion according to the invention is caused by a phase transition and the phase transition in turn is caused by heating of the material, it may happen as a result of the heating, that the portion initially expands. That means, the heated zone may initially become larger and may cause compressive stresses acting on the portion (especially at the edge thereof), in particular in the case of an inner portion which cannot expand but to a limited extent. With starting ceramization, the zone may then shrink to a dimension which is smaller than its initial dimension.

As a result of the at least local shrinkage of the portion, the portion usually loses or reduces contact with the main part. The contraction of the portion thus results in a detachment of the portion from the main part.

A detachment due to contraction, i.e. shrinkage of the portion has the advantage that in particular strongly curved or closed-loop separation lines can be provided and portions that are predominantly or completely surrounded by the main part in the plane of the sheet-like element can be separated or removed in this way. In particular when an inner portion is shrinking, a gap is being formed between the inner cutout portion and the main part, so that the inner cutout portion can be removed from the glass or glass ceramic element. Particularly advantageously, such predominantly or completely inner portions can even be separated from thick glass or glass ceramic elements.

An advantage of inducing shrinkage of the portion by initiating one or more phase transitions in the region of the portion is that a sufficient degree of contraction of the portion relative to the main part can be achieved even if heating of the main part and/or cooling of the portion is not sufficient for this purpose, for example because the coefficient of thermal expansion of the glass or the glass ceramic is too low, or because the generation of the temperature difference required between the main body and the portion is not practicable anymore, or because the dimensions of the portion are too small.

According to the invention, at least the main part remains intact as a whole when the portion is separated from the main part at the adjacently aligned filamentary damages.

Accordingly, laser filamentation is in particular not performed in the main part. Rather, the zone of laser filamentation only adjoins the main part at the edge thereof. After separation of the portion, the main part will exhibit damages as introduced by the filamentation only at the edge thereof.

In a preferred embodiment of the invention, both the portion and the main part remain intact as a whole when the portion is separated along the separation line at the adjacently aligned filamentary damages.

Preferably, laser filamentation is only performed within the zone of the intended separation line. Neither the portion nor the main part is damaged, with the exception of the damages caused by introducing the filaments along the intended separation line. Preferably, therefore, both the main part and the portion only exhibit the damages as introduced by filamentation at their cut edges after the separation. Hence, any further auxiliary filamentation within the portion which aims to destroy the portion is in particular dispensed with. This advantageously reduces processing complexity compared to a process involving such auxiliary perforations and moreover minimizes the risk of detrimental crack propagation into the main part.

Another advantage of avoiding additional auxiliary perforations is that tensile stresses intended for separation along the intended breaking line unfold their full effect at the intended separation line and do not split up to additional auxiliary perforations.

A further advantage of preserving both the main part and the portion as a respective whole piece is that both parts can be reused. Depending on the purpose for which the separation process is applied, either the main part or the portion or both pieces may be of interest. If the main part is of interest, the preservation of the portion is advantageous because fewer residues and splinters will result and the portion can in turn be used as a starting material without need to be melted down. If both pieces are of interest, the precise complementary shape of the two pieces may be of advantage.

The generation of filamentary damages according to the invention is based on the use of a laser, which preferably emits ultrashort laser pulses (USP laser). The laser pulses generate filamentary damages precisely along the predetermined separation line across the sheet-like glass or glass ceramic element by locally destroying the material in the zone of interaction with the laser light. The filamentary damages are typically formed as a defined linear damage having a length that can be influenced by selecting suitable pulse energies and pulse durations. By producing a plurality of closely adjacent filaments, a perforation of the material is achieved.

With such a microperforation, a very high edge quality is achieved at the cut edges of the portion and of the main part. The method according to the invention therefore constitutes a precision separation process which ensures high edge quality and therefore in particular results in increased flexural strength of the main part and of the portion. The reason for this is that the flexural strength of a glass or glass ceramic material strongly depends on the quality of the cut edges. A neatest possible edge with the fewest and smallest possible and preferably no chipping, notches, or other unevenness at all significantly contributes to a reduction of the risk of breakage.

The quality of the cut edges and separation surfaces produced by the method of the invention both on the portion and on the main part is in particular distinguished by chipping of less than 10 micrometers, most preferably less than 5 micrometers, and by a roughness with an Rz value of less than 30 micrometers, preferably less than 20 micrometers, most preferably less than 10 micrometers.

The achieved edge quality is thus high enough so that subsequent sanding of the edges can often be dispensed with. This is in particular an advantage over sublimation cutting using a laser, in which a gap is formed as a result of the removal of material during cutting, which although allowing for direct removal of inner cutouts leaves indefinite edges which have to be sanded subsequently. Moreover, processing durations of sublimation cutting are longer.

The filamentary damages produced by the laser pulses by the method of the invention are typically formed as submicron hollow channels, i.e. as hollow channels having diameters of less than 5 µm, preferably less than 2 µm, most preferably less than 1 µm. Preferably, filaments having a length of at least 200 micrometers, more preferably at least 500 micrometers, are produced to facilitate separation of the portion.

Particularly advantageous for the generation of long filamentary damages is an operation of the ultrashort pulse laser in the so-called burst mode. In this operation mode, the laser pulse is not emitted as a single pulse, but as a sequence of pulses emitted in quick succession, which together form a pulse packet, a so-called burst. Accordingly, one embodiment of the invention contemplates an operation of the ultrashort pulse laser in the form of an emission of laser pulses in time succession, in the form of bursts or pulse packets, wherein each of such bursts preferably generates a respective one of the filamentary damages.

Such a pulse packet generally has a slightly higher energy than a single pulse in the conventional single-shot operation. However, the pulses of a burst contain significantly less energy than a single pulse. With regard to the pulses within a burst it may be intended that the pulse energies are flexibly adjustable, in particular that the pulse energies either remain essentially consistent or that the pulse energies increase or that the pulse energies decrease.

A suitable laser source according to the present invention is a neodymium-doped yttrium-aluminum-garnet laser having a wavelength of 1064 nanometers. The laser source in particular operates at a repetition rate which is between 1 kHz and 1000 kHz, preferably between 20 kHz and 110 kHz, more preferably between 30 kHz and 110 kHz, and most preferably between 35 kHz and 105 kHz. The scan rate can preferably be chosen such that, depending on the repetition rate, the spacing between adjacent filamentary damages will be at least 1 micrometer, preferably at least 3 micrometers, more preferably at least 4 micrometers, and at most 20 micrometers, preferably at most 10 micrometers, most preferably not more than 7 micrometers.

In this case, the suitable pulse duration of a laser pulse is in a range of less than 100 picoseconds, preferably less than 10 picoseconds. The pulse duration may even be less than 1 picosecond. Most favorably, the laser source is operated at a typical output power in a range from 20 to 300 watts. According to one advantageous embodiment of the invention, a pulse energy of more than 200 microjoules is applied in the burst, and furthermore advantageously a total burst energy of more than 500 microjoules, in order to achieve the filamentary damages.

In case the ultrashort pulse laser is operated in the burst mode, the repetition rate is the rate of repeated burst emission. The pulse duration is essentially independent of whether a laser is operated in the single-pulse mode or in the burst mode. The pulses within a burst typically have a similar pulse length as a pulse in the single-pulse mode.

According to one embodiment of the invention, material of the glass or glass ceramic element that is subjected to a phase transition is included finely distributed in a peripheral zone of the portion, which extends adjacent to the separation line.

A separation of the portion may often be successfully achieved by ceramization, or, more generally speaking, by partial phase transformation of a peripheral zone (peripheral rim) adjacent to the separation line in the region of the portion. In this way, contraction of the portion can be achieved in the peripheral zone, resulting in a detachment of the portion from the main body.

Especially if the portions are sufficiently large, it may be sufficient to treat only the peripheral zone. Preferably, it is accordingly contemplated that only material of the glass or glass ceramic element which is included finely distributed in the peripheral zone is subjected to a phase transition. In contrast to a complete ceramization, this allows to save time and energy, i.e. processing is optimized.

By way of example, the peripheral zone extending adjacent to the separation line may preferably have a width of not more than 50 millimeters, more preferably of not more than 30 millimeters, most preferably not more than 15 millimeters.

However, especially in the case of inner portions (inner geometries) it has to be considered that the width of the gap resulting between the portion and the main part due to the contraction of the portion provides the possibility of easily removing the portion. Therefore, the peripheral zone (peripheral rim) furthermore preferably has a certain minimum width.

For example, the peripheral zone extending adjacent to the separation line may preferably have a width of at least 5 millimeters, more preferably of at least 7.5 millimeters, yet more preferably of at least 10 millimeters.

The above considerations, in particular for interior cutouts, can be generalized as follows: Let $\gamma$ be a contraction factor which describes the percentage contraction of the glass or glass ceramic material due to ceramization. The contraction factor $\gamma$ is preferably 1 percent, more preferably 2 percent and even more preferably 3 percent. Furthermore, R shall denote the mean roughness of the edge surface along which the portion detaches from the main part along the filamentary separation line. Then, suitably, the width of a peripheral zone extending adjacent to the separation line and which is ceramized is at least $R\theta/2\gamma$ and furthermore suitably at most $R\theta/\gamma$, wherein $\theta$ assumes a value of 1 in particular if the edge surface is perpendicular to the surface of the glass or glass ceramic element. Otherwise, $\theta$ may preferably also assume a value in the interval $[\pi/3,\infty[$, which is related to the angle of the edge surface to the surface of the glass or glass ceramic element.

It should furthermore be noted that in case the aforementioned minimum value $R\theta/2\gamma$ for the width of a peripheral zone to be ceramized exceeds half of the largest dimension of the portion, the entire portion is favorably ceramized.

In another embodiment of the invention, material of the glass or glass ceramic element, which is subjected to a phase transition is included finely distributed throughout the entire portion.

It may in particular be intended to ceramize the entire portion. By the ceramization, or, more generally, phase transformation of material it is possible to cause a contraction of the entire portion. This may cause a larger shrinkage than occurs with ceramization only along a periphery.

The treatment of the entire portion is in particular advantageous if the portion is rather small so that it does not suffice anymore to cause phase transition of material merely in a peripheral zone. However, in the case of large portions it may also be intended to ceramize the entire portion, for example because the portion is of interest as a glass ceramic element.

According to a refinement of the invention it is contemplated that once the portion became separated from the main part at the filamentary damages adjacently aligned along the separation line, material of the glass or glass ceramic element, which is located in the region of the main part is subjected to a phase transition into a crystal phase.

More particularly, according to this embodiment of the invention it is intended to initiate or continue a ceramization of the glass or glass ceramic element within the region of the main part. That means, amorphous material which is finely distributed throughout the main part is crystallized. In other words, the main part is at least partially ceramized. More particularly, material which is uniformly distributed throughout the entire main part is crystallized, i.e. the entire main part is ceramized. Ceramization of the main part may in particular be desirable if especially the main part is of interest as an end product, for example as a cooktop panel, and is to be provided in the form of a glass ceramic that has specific properties, in particular a low coefficient of thermal expansion. Even if the initial sheet-like element from which a portion has been separated according to the invention is already provided in the form of a glass ceramic, further ceramization might be desirable in the region of the main part in order to achieve a specific desired proportion between glass phase and crystal phase.

The ceramization of the main part may be accomplished in the same way as for the portion, e.g. by exposition to electromagnetic radiation (in particular laser radiation) in order to heat the material to a phase transition temperature. If previously a ceramization has been caused in the region of the portion, it may in particular be desirable to ceramize the main portion in the same way, in particular to use the same processing parameters. Accordingly, both pieces, the main part and the portion may be ceramized similarly. Hence, the separated portion and the main part which are obtained may have the same properties. This may be desirable if both pieces are of interest as a final product.

In one embodiment of the invention, the glass or glass ceramic element is heated to a surface temperature above room temperature and below the phase transition temperature, in particular in the region of the main part and/or of the portion.

Preferably, a surface temperature of at least 100 degrees Celsius is adjusted, more preferably at least 200 degrees Celsius, yet more preferably at least 300 degrees Celsius, and most preferably at least 400 degrees Celsius, while the surface temperature is preferably at most 800 degrees Celsius, more preferably at most 700 degrees Celsius, and yet more preferably at most 600 degrees Celsius. The surface temperature may in particular be achieved by heating the glass or glass ceramic element in a furnace, and while maintaining the surface temperature, the glass or glass ceramic element may be ceramized locally, for example. It is favorably intended in this case to keep at least those regions of the glass or glass ceramic element at an elevated surface temperature, in which the material is subjected to a phase transition.

The glass or glass ceramic element may be heated to an appropriate surface temperature before material of the glass or glass ceramic element is subjected to a phase transition. Then, the glass or glass ceramic element may be kept at this surface temperature while material of the glass or glass ceramic element is subjected to a phase transition. As a result of maintaining a surface temperature, the material is caused to heat up and thus to adopt an increased temperature throughout the entire volume, although the laser-irradiated volume regions of the material are typically subjected to an even higher temperature.

By keeping the glass or glass ceramic element at an elevated temperature at least in portions thereof it is advantageously possible to reduce an occasional risk of damage of the main part. In particular if the following conditions are met, the main part can be protected by keeping the glass or glass ceramic element heated: (1) The material that is to undergo phase transition in the region of the portion is heated to cause the phase transition. (2) This heating causes thermal expansion of the portion. (3) The separation line divides the glass or glass ceramic element such that the portion is located at least partially inside and exerts compressive stresses on the main part due to its thermal expansion. Such compressive stresses can advantageously be reduced by keeping the glass or glass ceramic element at an elevated temperature, so that the latter thermally expands as a whole.

Furthermore, by maintaining the glass or glass ceramic element at an elevated temperature at least in portions thereof, it is advantageously possible for tensile stresses which initially arise locally where material is contracting, e.g. as a result of a phase transition, to become better distributed over larger areas of the glass or glass ceramic element. This in particular permits to promote a more uniform macroscopic contraction of the portion caused by a contraction of material in microscopic volume elements of the portion. Moreover, strongly localized high tensile stresses can be prevented from leading to unwanted cracking apart from the filamented separation line, so that rejects are avoided.

Apart from tiny amounts, no material is removed from the separation seam during the microperforation employed for the invention. When the filamentary damages have been introduced, both parts to be separated will still be substantially connected to each other. Once the microperforation according to the invention has been accomplished, a predetermined breaking line is existing in the material along the separation line, along which the material can readily separate as soon as appropriate stresses are induced in the material.

Appropriate tensile stresses in particular are those stresses that can be induced by a contraction of the portion along the predetermined breaking line. In the context of the method according to the invention this may already occur as a result of a contraction of material in the region of the portion in particular due to a phase transition, as described above.

However, it is also possible to perform an additional cleaving step, preferably after the microperforating and prior to the detachment of the portion. In a cleaving step, once the filamentary damages adjacently aligned along the separation line have been produced, a point of incidence of laser radiation, preferably of a carbon dioxide laser, is directed over the surface of the glass or glass ceramic element along the separation line so that local tensile stresses are caused in the material of the glass or glass ceramic element along the separation line in order to cause crack formation between adjacent filamentary damages.

In this manner, the perforation may be completed to form at least partially a separation seem, i.e. severing or cleaving of the portion from the main part can be achieved at least partially. If a complete separation seem is caused by the cleavage step, the subsequent contraction according to the invention will just cause the portion to detach from the main part. Such shrinking will then in particular allow to readily remove inner portions or portions jammed in the main part.

Thus, a cleaving step is used for preliminary separation. In this case, the glass element is preferably irradiated by a $CO_2$ laser along the separation line in order to generate thermo-mechanical stresses in the glass element at the separation line. This makes it possible to initiate formation of cracks connecting the filamentary damages along the separation line, but usually without the portion detaching from the main part.

Both the filament structures per se and additional cracks in the material as caused by a cleaving step are preliminary damages in the material extending along the separation line.

The cleaving method step may moreover be promoted by local cooling following the heating in order to increase the tensile stresses generated in the material.

In another embodiment, tensile stresses suitable to cause separation along the predetermined breaking line may as well be caused by temperature differences between the main part and the portion. Preferably, in this case, a temperature difference is caused between the average temperature of the main part and the average temperature of the portion, which temperature difference depends on the coefficient of thermal expansion of the glass or glass ceramic element and the dimensions of the portion, and which is at least 150 degrees Celsius according to one example, at least 200 degrees Celsius according to another example, and at least 300 degrees Celsius according to yet another example. Appropriately, in this case, the average temperature in the main part is higher than the average temperature in the portion. The three following options are in particular considered:

A first option is to cause expansion of the main part by heating the element exclusively in the region of the main part, while the element is not heated in the region of the portion. As a result, the element will expand stronger in the region of the main part than in the region of the portion. Thereby, a tensile stress can be produced in the glass element, due to which the portion will separate from the main part along the separation line. Thus, if it is desired to separate inner portions from the element, the substrate can be heated except for the inner geometries, for example by contacting one face of the substrate with a heating plate that has recesses corresponding to the inner geometries. Accordingly, the heating plate may have a heating zone adapted to the shape of the main part.

A second option is to cause expansion of the main part by heating the element in the region of the main part, and to cause contraction of the element in the region of the portion by cooling it. In this way it is possible to further increase the tensile stress in the material. For example, it is possible to cool the element in the region of the portion using air or other fluids, so that the latter is additionally cooled in the region of the inner geometry.

A third option is to cause contraction of the portion by cooling the element exclusively in the region of the portion, while the element is not cooled in the region of the main portion.

The aforementioned three options cause a temperature gradient in the glass or glass ceramic element, in particular across the predetermined breaking line described by the separation line. Such tensile stresses may cause the portion to detach from the main part along the separation line at the adjacent filamentary damages.

If the glass element is heated in the region of the main part, this step can be integrated into an optional subsequent toughening process or ceramization process of the main part.

It may be intended that once the portion has detached from the main part at the adjacent filamentary damages along the separation line, the main part is thermally toughened by exploiting the previously performed heating. This allows the main part to be thermally toughened in an energy-efficient manner, i.e. energy costs can be saved.

The thermal tempering or thermal toughening is based on quenching of the glass element to be toughened. In this process, first the surface of the element cools down, while there is still a warmer or softer phase in the interior. The temperature difference to the environment will then be greater inside than outside. The interior of the glass element would then contract more, but this is prevented by the already solid surface. As a result, a tensile stress arises in the interior, while a compressive stress is produced at the surface.

An advantage of thermal toughening is that this is a rather inexpensive method of increasing strength. Hence, an efficient method for separating and subsequent toughening is provided in this way. The economic benefit is increased thereby. On the other hand, thermally toughened glass elements are usually not well suited for being cut and severed. However, according to the present embodiment of the invention, the microperforating, cutting, and separating will not be necessary anymore after the toughening, because all necessary separation steps can be performed previously on the not yet toughened glass element.

Toughening of heated parts immediately following the separation is in particular made possible due to the employed precision separation method using filamentation, which produces a high edge quality, so that it is in particular not necessary for the edge as produced by the separation of the portion from the main part to be sanded or otherwise processed.

Furthermore, it is also possible to take advantage of a previous heating of the main part in order to promote ceramization of the main part following the separation of a portion. As mentioned above, an increased substrate temperature during ceramization may contribute to a spatial distribution of locally generated tensile stresses and thus to the prevention of undesirable formation of cracks. These advantages can thus be achieved at the same time and in an energy-efficient manner.

In one embodiment of the invention, the glass or glass ceramic element has a thickness of at least 0.5 millimeters, preferably at least 2 millimeters, more preferably at least 3 millimeters, most preferably at least 4 millimeters. The inventive method is particularly suitable for sheet-like elements having the aforementioned thicknesses, but can also cope with thicknesses of more than 6 or even more than 8 millimeters.

By contrast, with conventional separation methods such as by applying a bending moment, the separation of glass or glass ceramics along predetermined breaking lines that have a generally curved shape, angled sections, or even define a closed loop becomes increasingly difficult with increasing thickness of the glass. This is due to the fact that in the case of conventional separation processes, the risk of jamming between the parts that are still in contact continues to increase with increasing substrate thickness. Therefore, reliable separation in conventional manner may become difficult or even impossible in the case of rather thick glass elements. As mentioned above, the method described in EP 2 781 296 A1 also reaches its limits in the case of thick substrates.

Furthermore, the glass or glass ceramic element preferably has a thickness of at most 20 millimeters, more preferably of at most 15 millimeters, and most preferably at most 10 millimeters. Glass or glass ceramic elements of such maximum thicknesses are still well suited for being severed and for reliably separating the portions using the method according to the invention.

In the case of thicker glass elements it is often not possible anymore or at least inappropriate to perform the microperforation across the entire thickness in one processing step or by passing the point of incidence of the laser beam along the separation line in a single pass. Rather, for enabling simple and reliable separation of the portion, it is favorable to perform two or more passes with different focal depths.

The invention advantageously allows for separation in particular even if the sheet-like glass or glass ceramic element is divided by the separation line in such a manner that the portion has a two-dimensional shape with a maximum dimension of less than 100 millimeters in the plane of the sheet-like glass or glass ceramic element. Separation is in particular even possible if the largest dimension is less than 80 millimeters. Also, separation is in particular even possible if the largest dimension is less than 60 millimeters. Advantageously, separation is in particular even possible if the largest dimension is less than 60 and more than 15 millimeters. Furthermore, most advantageously, separation can even be achieved if the largest dimension is less than 15 millimeters and greater than 10 millimeters.

The invention thus in particular permits to separate (very) small inner cutout portions, and this even from glass or glass ceramic elements of large thickness and/or low coefficients of thermal expansion. Separation methods that only use temperature differences between the main part and the portion, by contrast, will become difficult in the case of low coefficients of thermal expansion and with small inner cutouts, because the required temperature differences are so high that they cannot be realized anymore or only with difficulty.

However, it may be advantageous if the portion to be separated has a two-dimensional shape with a minimum dimension of more than 5 millimeters, preferably more than 10 millimeters, more preferably more than 20 millimeters in the plane of the sheet-like glass or glass ceramic element. Here, minimum dimension refers to the smallest characteristic length dimension in the plane.

In one embodiment of the invention, the sheet-like glass or glass ceramic element is divided by the separation line in such a manner that the main part has a two-dimensional shape which is not star-shaped in a sense of mathematical topology in the plane of the sheet-like glass or glass ceramic element.

With conventional separation methods, a separation of portions along predetermined breaking lines that have a generally curved shape or angled sections becomes increasingly difficult the stronger the separation line is curved or angled. Separation of a portion is particularly difficult if the portion is a partially inner or almost inner portion, so that the separation line almost forms a closed loop.

A useful criterion for the above is that the two-dimensional area which corresponds to the main part of the glass or glass ceramic element is not a star-shaped area anymore in a mathematical sense. This means that within this two-dimensional area there is no point from which any other point of the area can be reached via a straight link that lies entirely within the area.

Many separation processes encounter particular difficulties when the main part of the glass or glass ceramic element is not star-shaped. The reason for this is that a conventional application of bending moments typically does not result in a successful detachment or separation anymore. Moreover, during the microperforation that is employed, hardly any or no material at all is removed by the laser pulses, so that immediately after filamentation a removal of the portion from a main part that is not star-shaped will typically not be possible. The inventive method provides for such removal and at the same time ensures a very high edge quality.

Of course, the difficulty of separating portions along almost closed separation lines as mentioned above certainly applies to situations of completely closed separation lines, which corresponds to a separation of inner portions, that is to say the creation of holes or cutouts in a sheet-like glass or glass ceramic element, while the separated portion remains intact.

Accordingly, in a further embodiment of the invention the sheet-like glass or glass ceramic element is divided by the separation line in such a manner that the main part completely encloses the portion in the plane of the sheet-like glass or glass ceramic element.

While the main part can thus readily assume a shape that is not star-shaped, it will be advantageous if the portion has a shape that is star-shaped. In particular if the portion contracts while retaining its shape, due to a phase transition, such as in the case of complete and uniform ceramization of the portion, this allows for a contraction without entangling.

Some exemplary star-shaped two-dimensional shapes that may be assumed by the portion in the plane of the glass or glass ceramic element include those of a regular polygon, a regular polygon with rounded corners, an oval, or a circle.

It may be intended to perform several passes with the laser along the intended separation line using a respective different focal depth for each pass in order to produce filaments in different depths of the material. This is particularly advantageous if the length of the filaments formed by the laser processing is not sufficient to perforate the glass across its entire thickness.

However, in practice, an undesirable minor offset of the filamentary damages relative to those from the previous pass may result in the plane of the sheet-like element during a further pass along the same separation line. Such a random offset corresponds to a step in the separation surface which may impede separation.

According to one embodiment of the invention it is therefore contemplated to produce filamentary damages in the volume of the glass or glass ceramic element adjacently aligned along an offset line which is spaced from the separation line by at least 5 and at most 50 micrometers, preferably at most 40, more preferably at most 30 micrometers, wherein a projection of these filamentary damages onto the longitudinal extension of the filamentary damages located along the separation line exhibits an overlap of less than 200 micrometers, preferably less than 100 micrometers, more preferably less than 50 micrometers.

In this way, a predefined offset is caused, which is formed in a manner so as to promote a separation of in particular at least partially inner portions.

Furthermore, it is possible in similar manner to generate filamentary damages in the volume of the glass element along a second offset line that is spaced apart from the first offset line.

According to a further embodiment of the invention, the laser pulses are directed obliquely onto the surface of the glass or glass ceramic element, so that the direction of light propagation of the laser pulses and thus also the longitudinal extension of the filamentary damages extends obliquely relative to the surface, and furthermore so that the separation line extends obliquely, preferably perpendicular, to the light incidence plane. The light incidence plane is spanned by the propagation direction of the laser beam and the surface normal.

In other words, the damage channels are introduced in such a manner that the direction of their longitudinal extension differs from the direction of the surface normal of the glass or glass ceramic element. As a result thereof, an inclined cut or separation surface is produced between the parts to be separated.

The creation of inclined filamentary damages, or, in other words, the introduction of the perforation into the material at an angle can be useful to facilitate the separation of a portion, because instead of a fit a certain opening angle is provided which further reduces the risk of jamming.

If glass or glass ceramic elements are processed with multiple laser passes at different focal depths, it may happen that the lengths of the filamentary damages become shorter at greater focal depths, that means the more the damage channels are spaced apart from the entrance side into the glass. The reason for this is that fractions of the laser radiation are reflected on the substrate surface when an inclination angle is used. Inclination angle means a non-zero angle between the surface normal of the glass or glass ceramic element and the direction of incidence of the laser pulses. Therefore, in the case of thicker elements it is often advantageous to keep the inclination angle small. In the case of small inclination angles, separation will usually also be possible without risk of jamming.

One application example for a separation of inner geometries is the manufacturing of cooktop cover panels made of glass (e.g. soda-lime glass) as the main part. In this case, the soda-lime glass will additionally be toughened.

According to the invention, a cooktop panel is furthermore provided, which comprises a sheet-like glass or glass ceramic element that is producible or produced as a main part using the method according to the invention.

The sheet-like glass or glass ceramic element accordingly has in particular two opposite faces and an edge surface connecting these two faces, and the edge surface includes filamentary damages extending next to each other, which form indentations in the edge surface, each of the filamentary damages having a longitudinal extension in the direction from one edge to the other edge which define the transition between the edge surface and the faces.

The sheet-like glass or glass ceramic element may furthermore have a two-dimensional shape in the plane of the sheet, which is not star-shaped. A rectangular shape is preferred, in particular with rounded corners, which has at least one missing area in the form of an inner cutout corresponding to a separated portion. The peripheral edge surface of the at least one inner cutout in particular includes filamentary damages forming indentations in the edge surface.

The at least one missing area has in particular the shape of a circle, rectangle, or of a rounded rectangle. The at least one missing area is preferably located in a central third with respect to one and/or both extensions of the sheet-like glass or glass ceramic element in the plane of the sheet.

Furthermore, a grid-like array comprising a plurality or multitude of cutouts may be provided.

A further embodiment of the cooktop panel according to the invention comprises a tubular cooker exhaust receiving means which is connected to the sheet-like glass or glass ceramic element such that the at least one cutout area corresponding to the separated portion is in communication with the interior of the tubular cooker exhaust receiving means.

The cooker exhaust receiving means may be provided in the form of a tube or shaft leading downwards, which is connected to the lower face of the sheet-like glass element in an air-tight manner or is mounted recessed in a cutout area adjacent to an edge surface of a cutout area, so that fumes, odors, and/or vapors can be sucked downwards. The cooker exhaust receiving means is a passive element to which a suction device can be connected.

BRIEF DESCRIPTION OF THE DRAWINGS

The invention will now be explained in more detail with reference to the accompanying figures, wherein the same reference numerals designate the same or equivalent elements, and wherein:

FIG. 5b is a schematic side view of the oblique filamentary damages of FIG. 5a;

FIGS. 8a and 8b are schematic perspective views of sets of sheet-like glass elements;

DETAILED DESCRIPTION

Figure 1A:
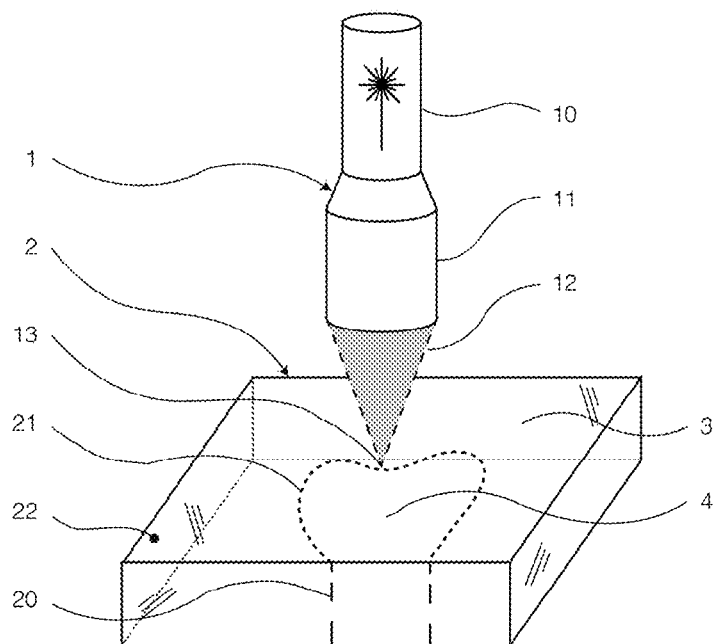
FIG. 1a is a schematic perspective view of a laser processing device for producing filamentary damages in the volume of a glass or glass ceramic element along a closed-loop separation line.
Figure 1B:
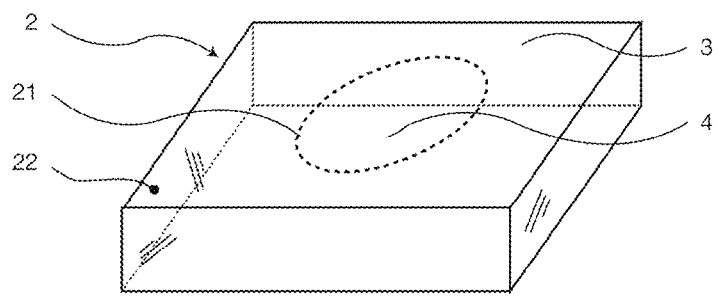
FIGS. 1b, 1c, and 1d are schematic perspective views of glass or glass ceramic elements having filamentary damages along different closed-loop separation lines.
Figure 1C:
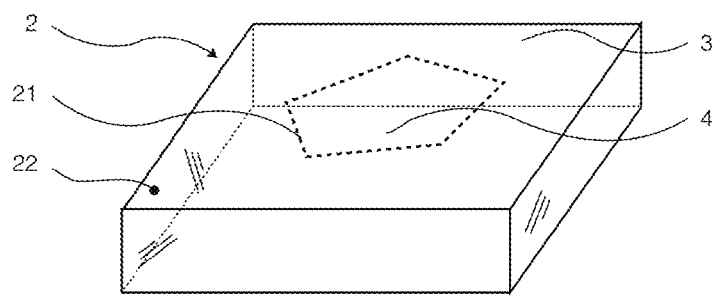
Figure 1D:
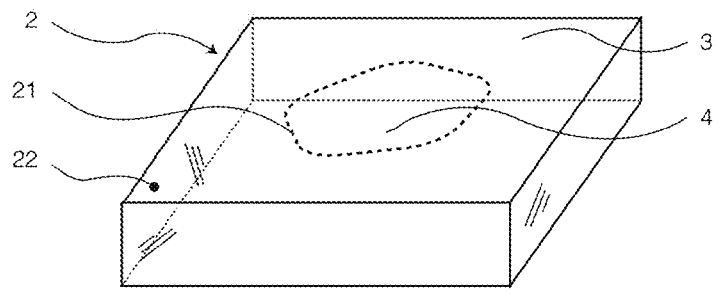

FIG. 1a shows a laser processing device 1 which can be used for microperforating a glass or glass ceramic element 2 by introducing filamentary damages 20 along a predefined separation line 21 and thus preparing it for subsequent separation.

Laser processing device 1 comprises an ultrashort pulse laser 10 for directing laser pulses 12 onto the glass or glass ceramic element 2. For this purpose, the laser pulses 12 are focused onto the glass or glass ceramic element 2 using focusing means 11. The wavelength of the ultrashort pulse laser 10 is selected so that the laser pulses 12 can penetrate into the glass or glass ceramic element 2.

The laser pulses 12 generate a plasma in the volume of the glass or glass ceramic element 2, which causes the filamentary damages 20. The incidence points 13 of the laser pulses 12 on the glass or glass ceramic element 2 are successively displaced over the surface 22 along the predefined separation line 21.

Separation line 21 is defined such that it completely divides the glass or glass ceramic element 2 into a portion 4 to be separated and a remaining main part 3.

Referring to FIGS. 1a to 1d, closed-loop separation lines 21 may have an oval shape, for example, or may be regular polygonal or regular polygonal with rounded corners.

FIGS. 2a-2f show portions 4 and main parts 3 as defined by separation lines 21 on the surface of a face, the main parts being represented by hatched lines.

Figure 2A:
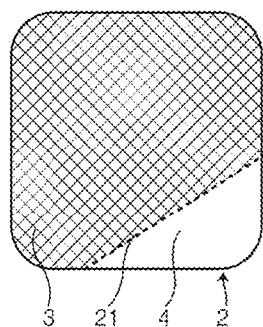
FIGS. 2a-2f are plan views of various forms of separation lines and corresponding main parts and portions.
Figure 2B:
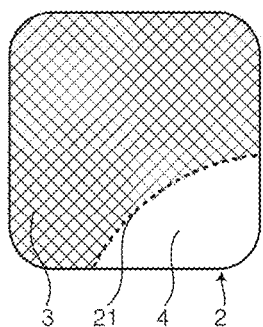

Referring to FIGS. 2a and 2b, a damage-free separation of portion 4 from main part 3, i.e. detachment in such a manner that both the main part 3 and the portion 4 are not further damaged except for the microperforation at the separation surface, is feasible particularly easily if the separation line 21 is a straight line or is only slightly curved. In such cases, detachment may possibly even be achieved merely by applying a sufficient bending moment, although this might be unfavorable for achieving a neat cut edge.

Figure 2C:
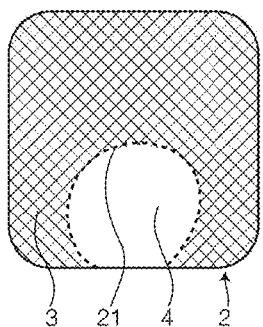
Figure 2D:
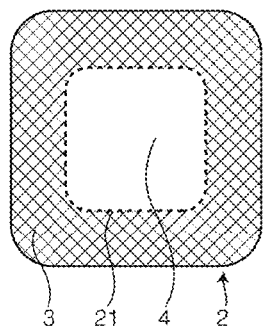
Figure 2E:
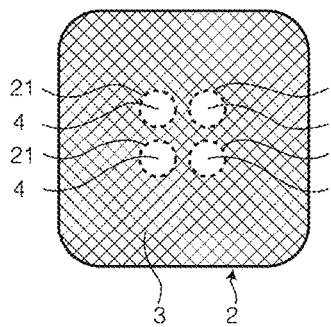

However, in conventional separation processes difficulties will especially arise in the case of strongly curved or closed-loop separation lines, as in the cases exemplified by FIGS. 2c to 2e, where portion 4 constitutes a predominantly inner or completely inner portion in the plane of the glass or glass ceramic element 2, also being referred to as an inner cutout in the latter case. These cases may be summarized by the fact that the two-dimensional shape of the main part 3 is not star-shaped in the sense of mathematical topology in the plane of the glass or glass ceramic element 2. Moreover, in the case of an inner cutout, the main part has a shape that is not simply contiguous. In all these cases, the separation method according to the invention is outstandingly useful, in contrast to conventional processes.

Referring to FIGS. 2a to 2e, it may sometimes be advantageous for the method of the invention if the two-dimensional shape of a portion 4 is star-shaped in the plane of the glass or glass ceramic element 2, i.e. if at least one star point exists in the two-dimensional area corresponding to a portion 4. This is because such a star point can serve as a contraction center during separation by contracting the portion 4, so that the portion 4 will not become entangled with the main part 3 during contraction (towards a star point) while retaining its shape.

In the examples of FIGS. 2a to 2e, the surface areas of the portions 4 are even convex. Accordingly, all points of these areas are star points, or, in other words, the areas are star-shaped areas. It may possibly be advantageous for the separation if portions 4 represent convex areas in the plane of the sheet-like glass or glass ceramic element 2. Therefore, more generally and without being limited to the illustrated examples, it is contemplated according to an embodiment of the invention that portions are separated which have a two-dimensional shape of a convex area in the plane of the sheet-like glass or glass ceramic element.

However, it is not necessary for a contraction without entanglement that the shape of the portion is star-shaped or even convex in the plane of the glass. For example, an only partial contraction of the portion 4 may cause a contraction (in particular involving an alteration of the shape) in a manner so that even portions 4 can be separated that are not star-shaped.

Figure 2F:
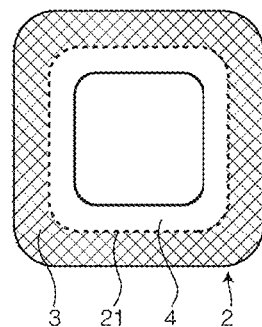

Referring to FIG. 2f, there may furthermore be situations in which portions 4 that are not star-shaped may be separated through a shape-retaining contraction. In this case, the glass or glass ceramic element 2 already has an inner cutout which is to be enlarged by separating an annular portion.

FIGS. 3a-3d shows exemplary procedures for causing the portion 4 to contract so that portion 4 separates from the main part 3 and becomes detached.

Figure 3A:
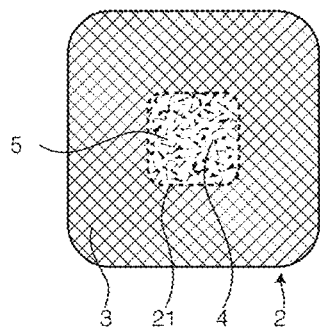
FIGS. 3a-3d are schematic plan views illustrating ceramization in the region of the portion in a peripheral zone as well as in the entire portion, and tensile stresses generated thereby at the separation line.

Referring to FIG. 3a, the glass or glass ceramic element 2 was irradiated over the entire surface area of portion 4 using laser radiation and by displacing a point of incidence on the surface of the element over the entire portion so as to heat it up to a ceramization temperature. Thus, the ceramization zone 5 corresponds to the portion 4 in this case. So, ceramization was initiated within the entire region of portion 4.

As a result of the heating of portion 4, a thermal expansion of the portion 4 would typically be expected initially. Since portion 4 is an inner portion so that compressive stresses on the main part 3 have to be expected due to an expansion of portion 4, provisions may preferably be made to keep the glass or glass ceramic element 2 at an elevated surface temperature while it is irradiated and heated in the region of the portion 4 by laser radiation.

By initiating the ceramization in the region of portion 4, amorphous material of the glass or glass ceramic element 2 in the region of portion 4 was crystallized.

In the case of an initially completely amorphous glass element 2, the ceramization is started. However, it is also possible to further continue ceramization in the case of glass ceramic elements 2 that already include crystallites. Glass ceramic elements 2 may in particular comprise CERAN®, ROBAX®, and/or ZERODUR®.

Due to the ceramization, material that is finely distributed over the ceramization zone 5 transitions from an amorphous to a crystalline phase. That means, a multiplicity of seed crystals are formed which grow to crystallites, or already existing crystallites grow to form larger structures. Thus, after ceramization, the material includes at least two coexisting phases: an amorphous phase and a crystalline phase.

The crystalline phase has a higher packing efficiency or atomic packing factor than the amorphous phase. Therefore, the phase-transformed crystallized material reduces its volume, i.e. it contracts. As a result, a large number of locally finely distributed contraction centers are arising entailing tensile stresses in the entire ceramization zone 5. Since the crystalline phase and thus the contraction centers are uniformly distributed over the entire ceramization zone 5, this causes net tensile stresses which are directed into the ceramization zone 5 from outside. In the example of FIG. 3a, the ceramization zone 5 corresponds to the portion 4, so that the net tensile stresses are directed from the main part 3 into the portion 4. These net tensile stresses are indicated by arrows in FIG. 3b.

Figure 3B:
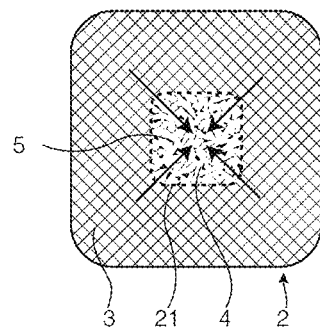
Figure 3C:
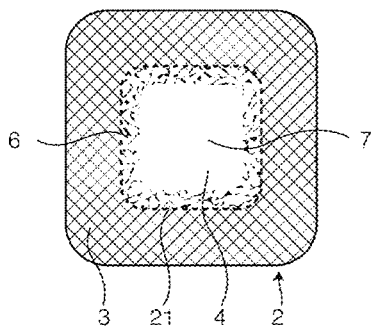
Figure 3D:
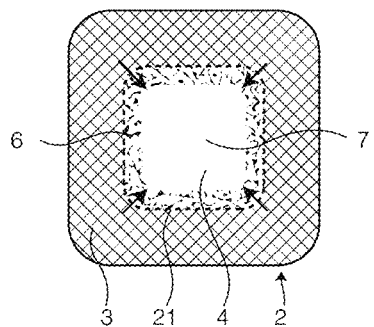

Referring to FIG. 3c, portion 4 was ceramized only partially, namely in the annular ceramization zone 6, while the complementary region 7 of portion 4 was not ceramized. Here, the ceramization zone 6 corresponds to a peripheral zone of portion 4 adjacent to the separation line 21.

Thus, finely distributed phase transition-related contraction centers arise within the peripheral zone of portion 4, causing net tensile stresses that are again directed from main part 3 into the portion 4. This procedure is in particular suitable for large portions 4, because the shrinkage produced in this way may already be sufficient in the case of large portions 4. Thus, if it is not desired for portion 4 to be converted into a homogeneous glass ceramic, processing can be optimized in this way.

Preferably, the peripheral phase transformation is applied for portions above a certain minimum surface area. It may be sufficient for the laser beam intended for heating up to the ceramization temperature to be passed over the portion in parallel to the filamented separation line at some distance therefrom so as to locally produce the necessary shrinkage of material. For example, it may be intended that the minimum distance between the filamented separation line and a laser advancement line or ceramization line is greater than 1 millimeter, preferably greater than 2 millimeters, and most preferably greater than 3 millimeters.

Since the glass or glass ceramic element 2 of FIGS. 3a and 3b is perforated along the separation line 21, the tensile stresses extending across the separation line 21 may cause the portion 4 to break off from the main part 3 along the separation line 21 (cleaving), if the tensile stresses are strong enough and the filamentary damages of the perforation are located close enough to each other. The magnitude of tensile stresses may in particular be influenced by the ratio by volume of the crystalline to the amorphous phase. This volume ratio, in turn, depends on the duration during which the ceramization zone 5, 6 is maintained at the ceramization temperature. The longer this duration, the more material will be phase-transformed.

Figure 4A:
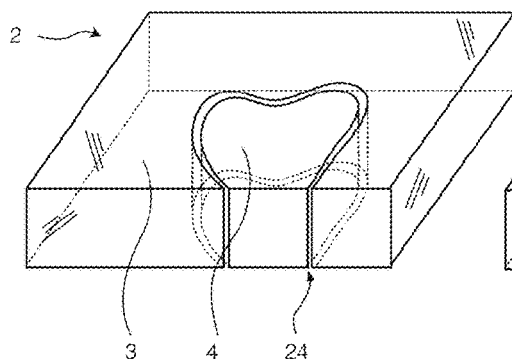
FIGS. 4a and 4b are schematic perspective views of a filamented glass or glass ceramic element that caused to contract in the region of the portion so that the portion can be removed.
Figure 4B:
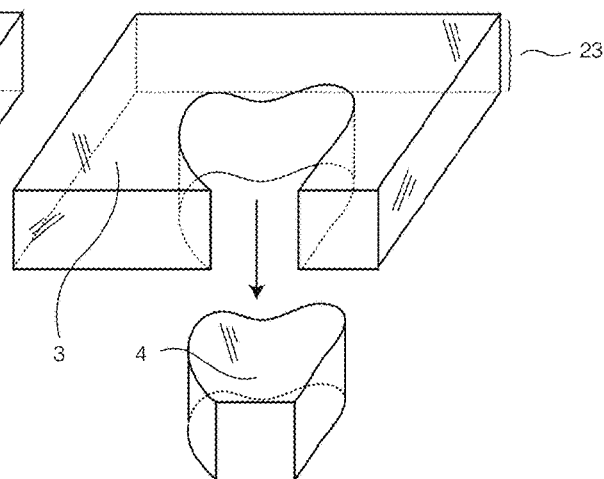

Referring to FIGS. 4a and 4b, in particular once the portion 4 has been broken off from main part 3 due to the tensile stresses directed towards the interior of the portion, it will be capable of contracting so that a gap 24 will be forming between portion 4 and main part 3. Thus, after having been severed from the main part along the filamentary damages along separation line 21, portion 4 can detach, in particular lose contact with the main part 3. The resulting gap 24 provides a certain clearance enabling to separate the portion 4 from the main part 3 without jamming. The shrinkage of portion 4 thus allows to remove the latter along the surface normal of the faces (indicated by an arrow), in particular from main parts 3 that are not star-shaped so that lateral removal is not possible. Hence, with the ceramization and contraction of portion 4 it is in particular possible to separate inner cutout portions. Provided sufficient shrinkage of portion 4, removal thereof may in particular be possible without friction. However, irrespectively of the shape of separation line 21, the method moreover advantageously allows to separate portions 4 if the glass or glass ceramic elements 2 have a large thickness 23, in particular of more than 3 mm, preferably more than 5 mm, yet more preferably of more than 7 millimeters.

The gap 24 preferably has a gap width of at least $R\theta/2$, wherein R denotes the average roughness of the cut edge (edge surface), and $\theta$ takes a value which may in particular be 1 or may be related to the angle between the separation surface and the surface of the glass or glass ceramic element 2, as described above.

In order to increase shrinkage of portion 4 and the gap width of gap 24, it may be intended to cool the glass or glass ceramic element 2 in the region of portion 4 and/or to heat it in the region of the main part 3. Cooling of portion 4 is preferably performed after portion 4 has been ceramized at least partially. This is because, as described above, it is advantageous during ceramization to maintain the portion 4 at an elevated temperature as part of the entire glass or glass ceramic element 2.

Figure 5A:
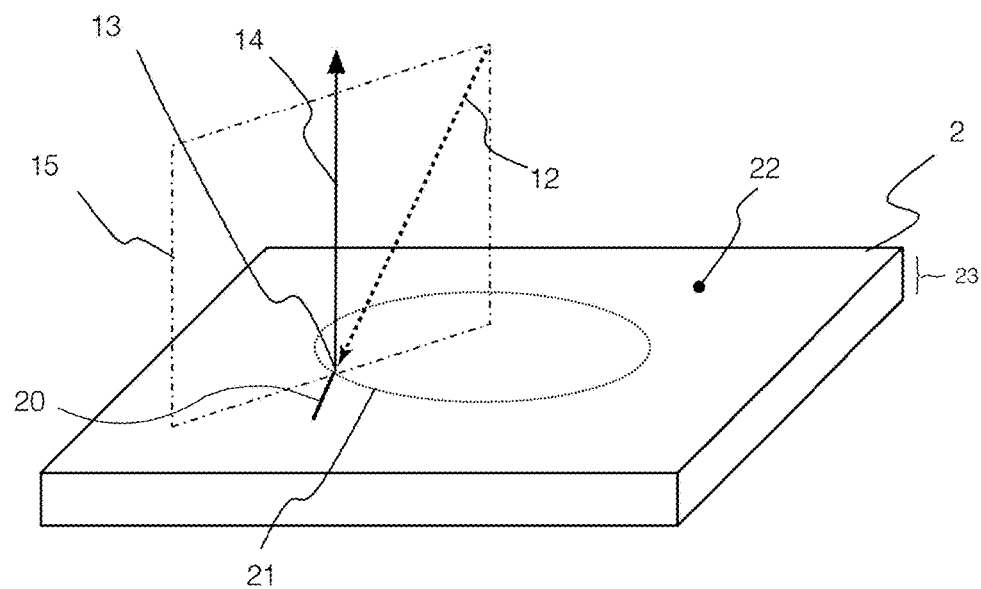
FIG. 5a is a schematic perspective view of an alternative laser processing device for producing oblique filamentary damages.

As can be seen from FIG. 5a, it is also possible according to one embodiment of the invention, to obliquely direct the laser pulses 12 onto the surface 22 of glass or glass ceramic element 2, so that an angle exists between the surface normal 14 and the direction of laser pulses 12. Therefore, the longitudinal extension of the filamentary damages 20 will also extend obliquely to the surface 22. Moreover, the influence of refraction of the laser light on the surface 22 of the glass element 2 has to be considered.

In order to facilitate the separation of the portion, the angle between the light incidence direction and the surface normal 14 may range from a few degrees to well over 10°. Preferably, an angle in a range from 3° to 30°, more preferably 3° to 15°, most preferably at least 5° is set between the light incidence direction of the laser pulses 12 and the surface normal 14 of the surface 22 of glass element 2.

As can be seen from FIG. 5*a*, the laser pulses 12 are furthermore directed obliquely onto the surface 22 in such a way that the plane 15 of light incidence is transverse, preferably perpendicular to the separation line 21. Accordingly, the direction of advancement along which the point of incidence 13 is displaced over the surface 22 is also transverse, preferably perpendicular, to the light incidence plane 15. Light incidence plane 15 is spanned by the light incidence direction and the surface normal 14. If the separation line 21 is curved, for example circular, as in the example shown, the orientation of the separation line 21 transverse to the light incidence plane 15 is to be understood as meaning that the tangent to the separation line 21 is transverse, preferably perpendicular, to the light incidence plane 15.

Figure 5B:
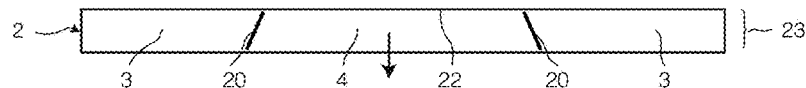

FIG. 5*b* shows a sectional view of the glass or glass ceramic element 2 corresponding to FIG. 5*a*. Due to the angle between the longitudinal extension of filamentary damages 20 and the surface normal 22, a preferred direction is resulting along which the portion 4 can be separated from the main part 3, as indicated by the arrow.

FIGS. 6*a*-6*h* shows sectional views illustrating glass or glass ceramic elements 2 in a view similar to FIG. 5*b* after a plurality of laser processing steps in different focal depths. That means, after a processing step in which damages 20 are produced in the volume of the glass or glass ceramic element 2 by laser pulses 12 of an ultrashort pulse laser by moving the points of incidence 13 of the laser pulses 12 on the glass or glass ceramic element 2 over the surface 22 thereof along separation line 21, further processing steps are performed in which damages 20', 20", etc. are produced in similar manner, but with different focal depths of the laser pulses 12, in other depths in the volume of the glass or glass ceramic element 2.

Such multiple laser processing is particularly suitable for thicker glass or glass ceramic elements 2, where it is often not possible anymore or at least inappropriate to perform the microperforation over the entire thickness 23 in a single processing step or by displacing the point of incidence 13 of the laser beam 12 along the separation line 21 in only one pass.

A problem that may arise when repeatedly passing the laser beam in different focal depths is that the damages in different depths of the volume of the glass or glass ceramic element 2 will not be aligned ideally.

Figure 6A:
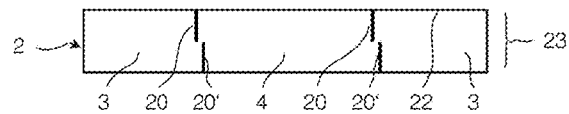
FIGS. 6a-6h are schematic side views of glass elements after repeated laser processing.

FIG. 6*a* schematically illustrates, by way of example, a glass or glass ceramic element 2 after two laser processing steps over the surface 22 thereof. Damages 20' were produced in a first processing step, while damages 20 located there above were produced in a second step. Damages 20' and 20 have a certain offset from each other, which typically exhibits statistical variations due to finite nature of positioning accuracy. This offset makes it difficult to separate portion 4 from main part 3 using the method according to the invention. Due to the offset, a roughness R' of the edge surface is resulting, which is increased as compared to the roughness R caused by the filamentation.

According to a refinement of the invention it is contemplated to produce the offset between damages 20' and 20 in such a manner that only the roughness R caused by filamentation is relevant for a separation of portion 4 from main part 3, but not the roughness R' of the edge surface when taking into account the offset.

Figure 6E:
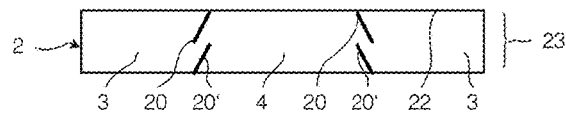
Figure 6B:
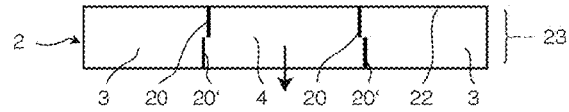

As illustrated in FIG. 6*b*, the damages 20' which are located deeper in the volume of glass element 2 with respect to surface 22, are produced in such a manner that the portion 4 is slightly larger on the face opposite to surface 22 than on the face of surface 22. Thereby, a preferred direction is resulting, along which the portion 4 can be separated from the main part 3, as indicated by the arrow. Along this preferred direction, only the roughness R caused by the filamentation is decisive for the separation, while in the direction opposite to the preferred direction, the roughness R' additionally resulting from the offset between damages 20' and 20 is decisive for the separation. Portion 4 does not need to be a completely inner portion, rather, all forms mentioned above are eligible. In case the portion 4 is a circular inner portion, it will have a cake-like shape, figuratively speaking, due to the offset between damages 20' and 20.

Figure 7A:
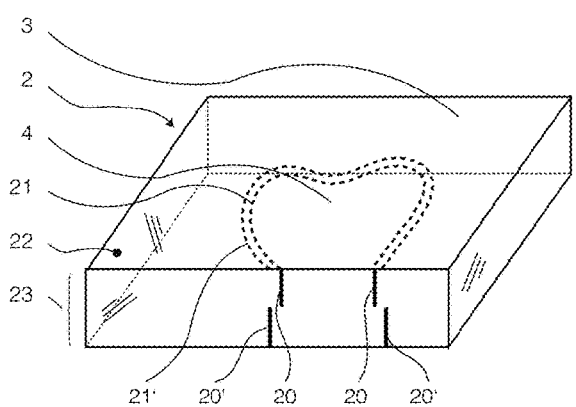
FIGS. 7a and 7b are schematic perspective views of glass or glass ceramic elements after repeated laser processing along a separation line and along additional offset lines.

While the damages 20 according to FIGS. 1*a* are generated by displacing the points of incidence 13 of the laser pulses 12 on the glass or glass ceramic element 2 over the surface 22 thereof along separation line 21, the damages 20' according to FIG. 7*a* are generated by displacing the points of incidence 13 of the laser pulses 12 on the glass or glass ceramic element 2 over the surface 22 thereof along an offset line 21' that is slightly spaced from separation line 21. The offset line advantageously extends completely on one side of the separation line 21. It is not necessary, albeit advantageous, that the spacing between offset line 21' and separation line 21 is consistent along the lines.

The described embodiment of the invention is not limited to two laser processing steps. It is also possible to perform three or even more passes with the laser. FIG. 6*c* schematically shows, by way of example, a sectional view through a glass or glass ceramic element 2 after three laser processing steps which caused damages 20", 20', and 20. FIG. 6*d* in turn illustrates how the offsets between damages 20" and 20' and between damages 20' and 20 can be produced according to this embodiment of the invention in such a manner that a preferred direction is resulting for separating portion 4 from main part 3, as indicated by the arrow.

Figure 7B:
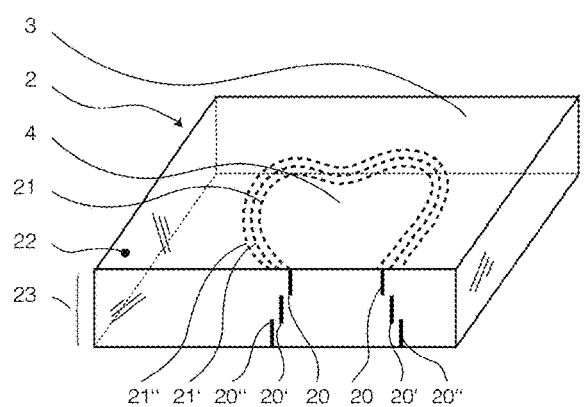

In this case, the damages 20' according to FIG. 7*b* have been produced by moving the points of incidence 13 of the laser pulses 12 on the glass or glass ceramic element 2 over the surface 22 thereof along a first offset line 21' that is slightly spaced from separation line 21. Furthermore, damages 20" have been produced by moving the points of incidence 13 of the laser pulses 12 on the glass or glass ceramic element 2 over the surface 22 thereof along a second offset line 21" that is spaced slightly further from separation line 21 than the first offset line 21'. Advantageously, the second offset line 21" extends completely on one side of the first offset line 21'. It is not necessary, albeit advantageous, that the spacing between the second offset line 21" and the first offset line 21' is consistent along the lines.

It is also possible to perform more than two laser processing steps. For this purpose, further offset lines can be defined which are again spaced slightly further from the separation line 21 and along which the points of incidence 13 of the laser pulses 12 are displaced over the surface 22 of glass or glass ceramic element 2.

The selective controlling of one or more offset(s) between damages that are produced by multiple laser processing steps at different focal depths can be combined with the laser processing illustrated in FIG. 5a according to which the laser pulses 12 are directed obliquely onto the surface 22 of glass or glass ceramic element 2. In practice, it is usually not possible for the angle between the direction of light incidence and the surface normal 14 to be exactly set to zero degrees. Thus, strictly speaking, there will always be a (very) small angle, so that the longitudinal extensions of the damage channels will always lie at a certain angle relative to the surface normal 14 of the glass or glass ceramic element 2. Similarly to the positioning, a statistical deviation smaller than the alignment accuracy has to be assumed here.

FIG. 6e shows oblique damages 20' and 20 as caused by two laser processing steps on a glass element 2. Again, damages 20' and 20 are not exactly aligned (not exactly in one plane) but have a certain offset from each other. Again, this makes it difficult to separate the portion 4 from the main part 3 using the method according to the invention.

Figure 6F:
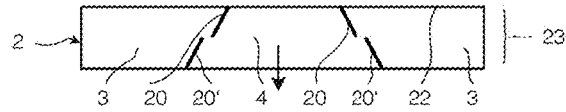
Figure 6C:
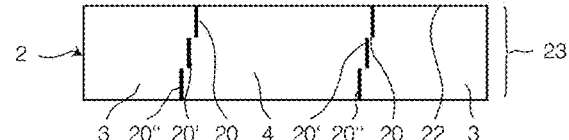

As shown in FIG. 6f, the offset can advantageously be adjusted such that a preferred direction for the separation is resulting (indicated by the arrow). Portion 4 can be separated from main part 3 along the preferred direction without any interfering effect by the edges that are caused by the offset.

Figure 6G:
Figure 6D:
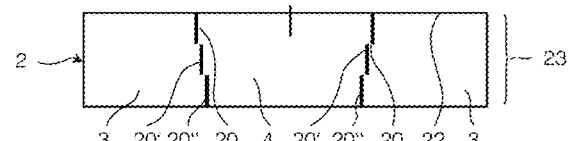
Figure 6H:
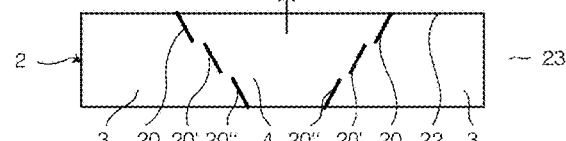

The described refinement of the invention is not limited to two laser processing steps with laser pulses 12 obliquely impinging on the surface 22. It is also possible to perform three or more laser processing steps at different focal depths. FIG. 6g schematically illustrates, by way of example, a sectional view through a glass element 2 after three laser processing steps with laser pulses 12 that are obliquely directed onto the surface, resulting in damages 20'', 20', and 20. FIG. 6h again shows how the offsets between damages 20'' and 20' and between damages 20' and 20 can be arranged in this embodiment of the invention such that a preferred direction is resulting for separating portion 4 from main part 3 (indicated by the arrow). The offsets do not need to be equal in practice.

Referring to FIGS. 8a and 8b, the method of the invention can be used to produce an inventive product in the form of a set of two sheet-like, i.e. panel-shaped or disc-shaped elements 2, 2'. FIGS. 8a and 8b each show a respective set.

A set according to the invention is distinguished by the fact that the two-dimensional shape one of the sheet-like elements 2 has in its plane is complementary to the two-dimensional shape the other one of the sheet-like elements 2' has in its plane.

Furthermore, two edges 27, 28 of the one element 2, which define the transition between the faces 29, 30 and an edge surface 25 connecting these faces 29, 30 each have a respective similar shape as two edges 27', 28' of the other element 2', which define the transition between the faces 29', 30' and an edge surface 25' connecting these faces.

These edge surfaces 25, 25' of the two sheet-like elements 2, 2' each include adjacent filamentary damages 26, 26' forming indentations in these edge surfaces 25, 25', and each of the filamentary damages 26, 26' has a longitudinal extension in the direction from one edge 27, 27' to the other edge 28, 28'.

These filamentary damages 26, 26' may originate from a microperforating laser processing process according to the method of the invention. If an element 2 (or 2') of a set is produced by the method according to the invention, this longitudinal extension of the filamentary damages 26 (or 26') corresponds to the direction of light propagation of the laser pulses 12.

The set of two sheet-like elements as shown in FIG. 8b is formed so that the two-dimensional shape one of the sheet-like elements 2 has in its plane completely encloses the two-dimensional shape the other one of the sheet-like elements 2' has in its plane. Referring to FIG. 8b, the element 2' is an inner portion fitting to element 2. Referring to FIG. 8a, the element 2' is a portion fitting to element 2 and may be referred to as a predominantly inner portion in this case.

What applies to both illustrated sets (FIG. 8a and FIG. 8b), preferably, is that the one sheet-like element 2 can accurately be fitted together with the other sheet-like element 2'. Such a set of two sheet-like elements that can be fitted together accurately, may fit so precisely that it is liquid-tight. This can be exploited for producing liquid-tight closures made of glass, for example.

If the two sheet-like elements 2 and 2' of a set would be combined in perfect fitting manner, the edge surfaces 25 and 25' of elements 2 and 2' would touch one another or would come very close to each other. Also, edges 27 and 27' would touch one another or would come very close to each other, and edges 28 and 28' would also touch one another or would come very close to each other. The two-dimensional surfaces in the planes of sheet-like elements 2 and 2' would fit together like two puzzle pieces when the two elements 2 and 2' would be joined.

It is contemplated that one or both of the sheet-like elements 2, 2' is/are at least partially and preferably completely ceramized. Accordingly, one of the sheet-like elements 2, 2' may be a glass ceramic element and the other one may be a glass element. It is also possible that both elements are glass ceramic elements. The ceramization may advantageously be accompanied by shrinkage of an inner element 2', so that the two elements 2, 2' can be assembled in accurately fitting manner without frictional or jamming issues. For this reason, it may furthermore be intended, for example, that one, in particular an inner element 2', is ceramized so as to include an HQss main crystal phase, while the other element 2 includes a Kss main crystal phase, since the creation of an HQss glass ceramic is typically accompanied by a stronger shrinkage than the creation of a Kss glass ceramic.

It may also be contemplated that one of the sheet-like elements 2, 2' is thermally toughened. As a result of the thermal toughening, the toughened element may remain in a state of slightly increased dimensions. Accordingly, possible frictional and jamming issues during assembly can be avoided.

It may as well be intended that one or both of the elements is/are sanded at the edge surface which includes filamentary damages. Possible assembling issues may also be avoided in this way.

The two sheet-like elements of a set are preferably originating from the same separation process. That means, by applying the method of the invention, an original sheet-like glass or glass ceramic element was divided into a main part and a portion, which when taken together form a set of sheet-like elements. If the two sheet-like elements of a set originate from the same process, a highest possible accuracy of fit is guaranteed, which is even higher than if a series of portions equivalent to each other were produced by a number of equivalent separation processes and a series of main parts equivalent to each other were produced by a number of equivalent separation processes and a set of sheet-like elements would be chosen to consist of any portion of the series of portions and any main part of the series of main parts.

Figure 9A:
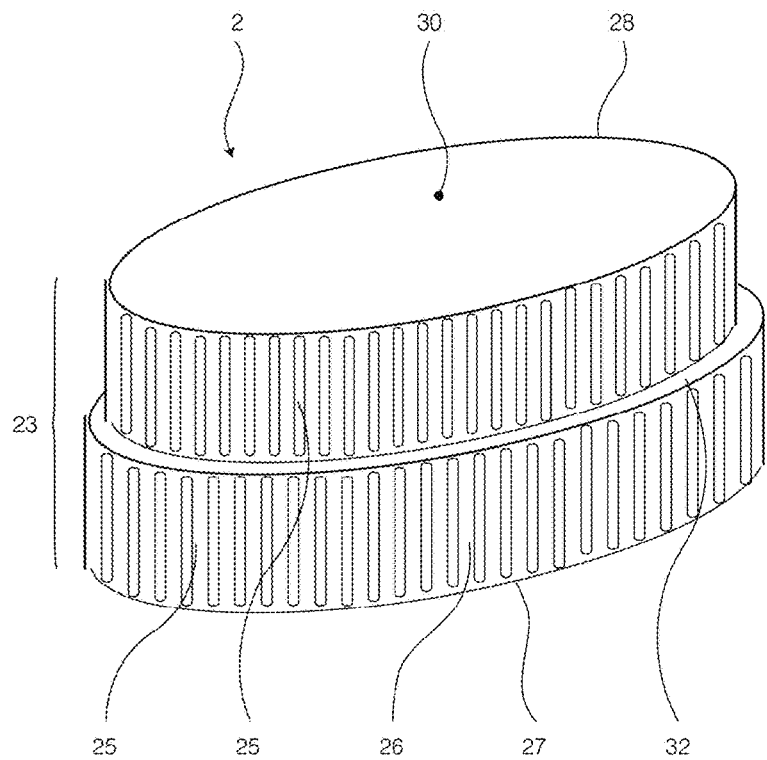
FIGS. 9a and 9b are schematic perspective views of sheet-like glass elements having an offset/offsets in the edge surface.
Figure 9B:
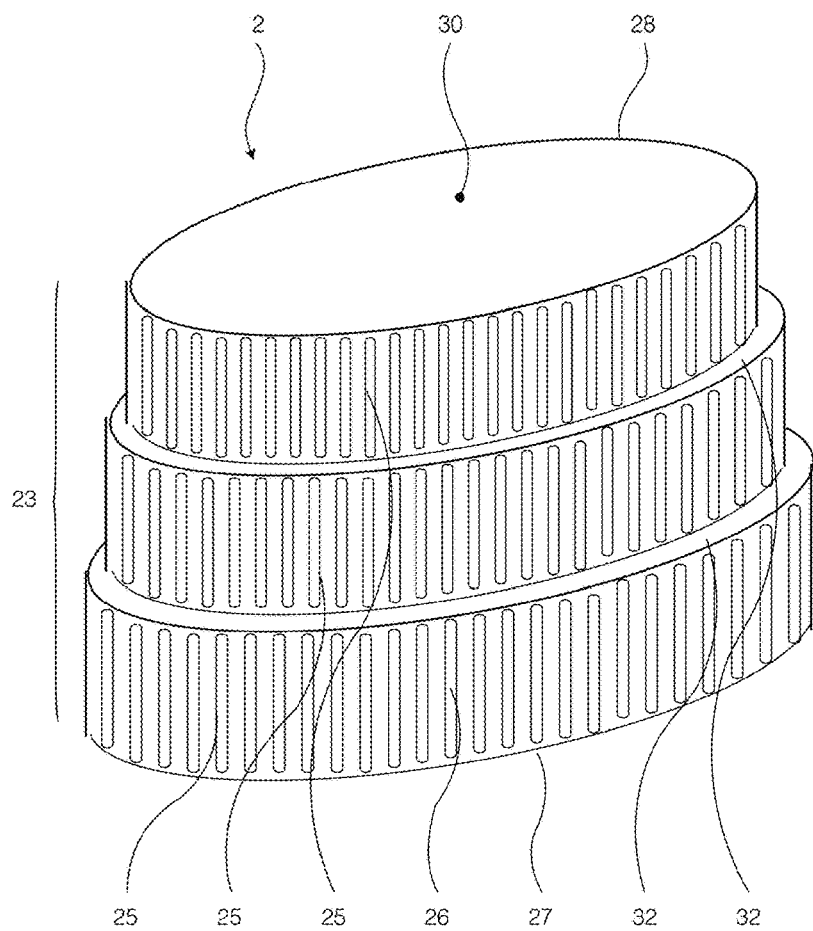

It may be contemplated that each sheet-like element 2 (or 2') of a set of two sheet-like elements has an edge surface 25 (or 25') which has at least one offset 32 (or 32'), i.e. a step, that extends transversely, preferably substantially perpendicular to the longitudinal extension of the adjacently aligned filamentary damages 26 (or 26'). FIGS. 9a and 9b show illustrations of such sheet-like elements 2.

The at least one offset 32 (or 32') may result in a roughness R' of the edge surface 25 (or 25') which is increased compared to the roughness R as caused by the filamentary damages 26 (or 26').

The at least one offset is a step that is imperceptible to the naked eye, so that it is still possible to speak of a single edge surface 25 (or 25'). Preferably, the at least one offset is a step of at least 5 micrometers and at most 50 micrometers.

FIG. 9a shows a sheet-like element 2 according to the invention, which is distinguished by an edge surface 25 including filamentary damages 26 extending next to each other, which form indentations in the edge surface 25, wherein a longitudinal extension of the filamentary damages 26 extends in the direction from one edge 27 to the other edge 28, which edges define the transition between the edge surface 25 and the faces 30 of the sheet-like element 2, and wherein the edge surface 25 has an offset 32 extending along the entire edge surface 25 and extending substantially perpendicular to the longitudinal extension of the filamentary damages 26. The offset is a step of at least 2 micrometers and at most 30 micrometers and preferably extends in the middle of the edge surface, with a deviation of 20 percent, that is to say in the middle between edges 27 and 28 with a deviation of 20 percent.

More generally, without being limited to this exemplary embodiment, the invention accordingly also relates to a sheet-like and at least partially ceramized glass element or glass ceramic element, wherein an edge surface of the at least partially ceramized glass element or glass ceramic element includes adjacent filamentary damages which form indentations in the edge surface, and wherein these filamentary damages each have a longitudinal extension in the direction from one edge to the other edge defining the transition between the edge surface and the faces of the at least partially ceramized glass element or glass ceramic element, and wherein the edge surface has at least one offset extending along the edge surface, preferably along the entire edge surface and extending transversely, preferably substantially perpendicular to the longitudinal extension of the filamentary damages.

FIG. 9b shows a further sheet-like element 2 according to the invention, which is distinguished by an edge surface 25 that has two offsets 32 extending along the entire edge surface 25 and extending substantially perpendicular to the longitudinal extension of the filamentary damages 26. The two offsets preferably extend with a spacing from the surface 30 of the element 2 of one third and two thirds, respectively, of the width 23 of edge surface 25, with a deviation of 20 percent.

The sheet-like elements 2 according to the invention are each at least partially and preferably completely ceramized.

Figure 10:
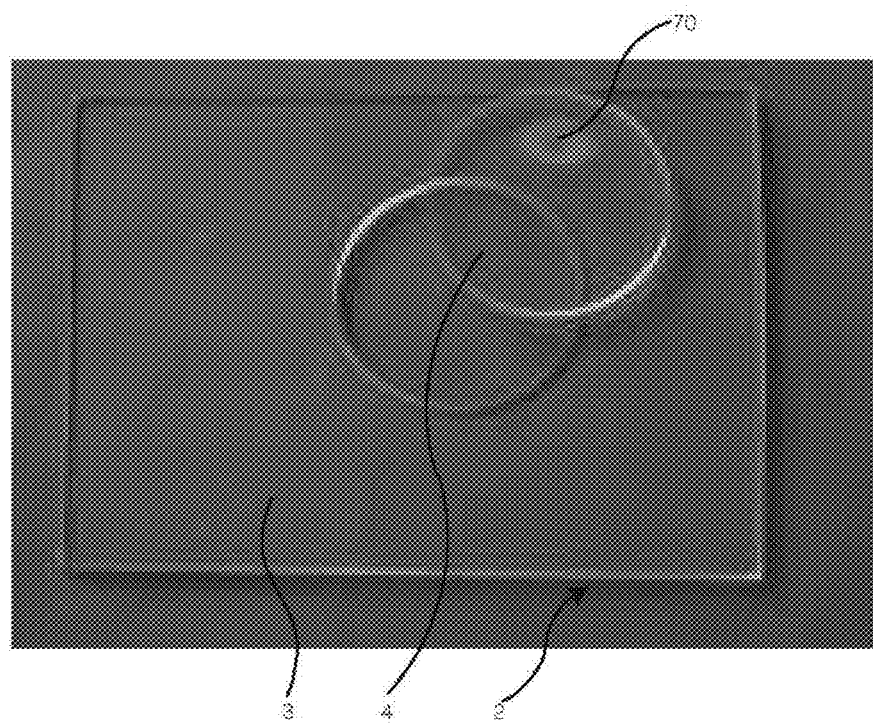
FIG. 10 shows a photograph of a glass sheet with a circular inner cutout which was separated by ceramization.

FIG. 10 shows a photograph of a glass element 2 of 4 mm thickness (here an LAS glass) with a (here circular) cutout area corresponding to a separated portion 4, the glass element 2 having been prepared as a main part 3 using the separation method that will be described in more detail below.

First, the glass element 2 was filamented using a USP laser along a (here circular) separation line. A laser frequency of 100 kHz with 6 bursts and an advancement rate of 400 millimeters per second was used. Adjacent filaments thus have a spacing of about 4 μm to each other. Five passes were performed, and in each pass filaments were produced with a difference in height level in the glass of 0.5 millimeters relative to the previous pass.

Subsequently, the filamentary pre-damage was traced by a $CO_2$ laser at 120 watts of average laser output power and a scanning rate of 30 millimeters per second in order to cause formation of cracks between adjacent filaments (cleaving). In other words, the inner portion 4 was severed from the main part 3 so that the two pieces were still engaging each other.

Then, the glass element 2 was preheated in a furnace to about 500 to 600 degrees Celsius. Thereafter, the inner portion 4 was ceramized by a $CO_2$ laser process (400 W) over a duration of 45 seconds along two concentric circular paths (2×8 mm) (sample GC_9). Location 70b on portion 4 shows the switching point of the laser scanner between the two circles.

Finally, the samples were cooled down to room temperature, and the ceramized inner portion 4 was removed from the main part 3.

In another exemplary embodiment, the inner portion was ceramized using a $CO_2$ laser (300 W) over a duration of 40 seconds along only one circular path (8 mm) (sample GC_7).

Figure 11:
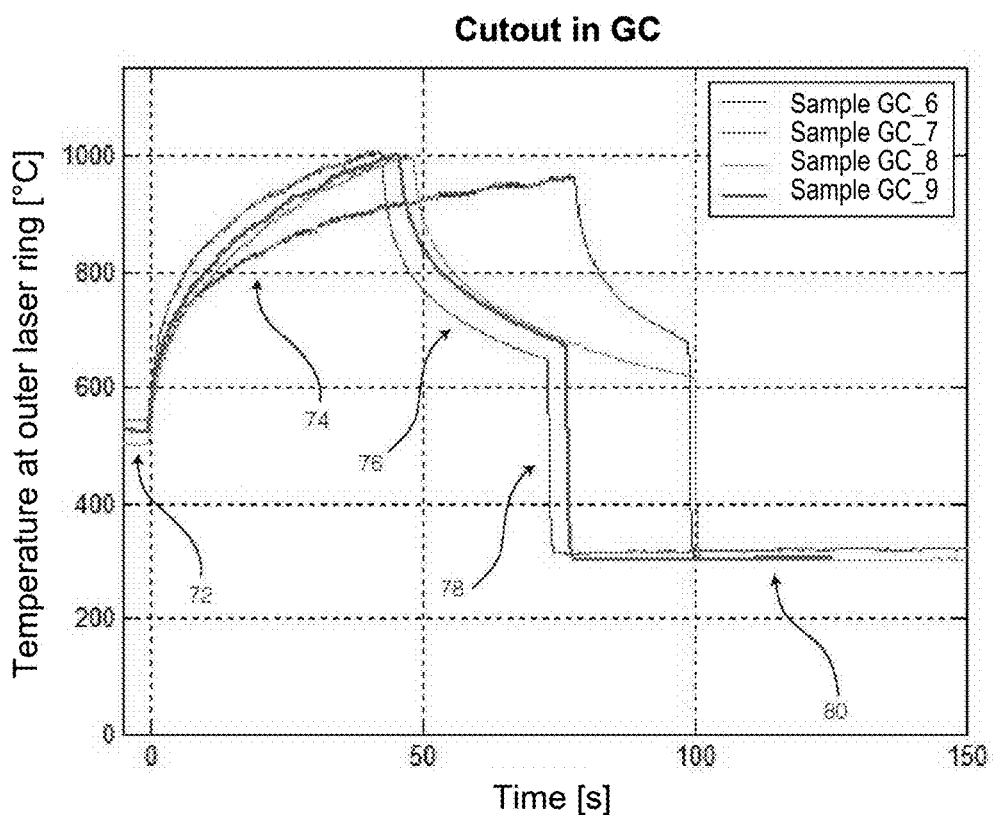
FIG. 11 shows graphs of measured temperature profiles at the periphery of portions to be separated, for four different samples similar to FIG. 10.

Referring to FIG. 11, the surface temperature of portion 4 was measured (after filamentation and cleaving has already been performed previously) during four separation processes (inter alia sample GC_9, sample GC_7).

During a first time interval 72, a temperature is reached which is caused by preheating the glass or glass ceramic element 2 in a furnace, and which is between 500 and 550 degrees Celsius in the present examples.

During a second time interval 74, the portion 4 is at least partially ceramized by being irradiated with a laser. The temperature thereby rises up to about 1000 degrees Celsius.

During a third time interval 76, laser irradiation is terminated so that the temperature of the portion returns to approach the furnace temperature.

During a fourth time interval 78, 80, the furnace temperature is lowered to about 300 degrees Celsius, thereby causing the substrate to further cool down to this temperature.

Figure 12:
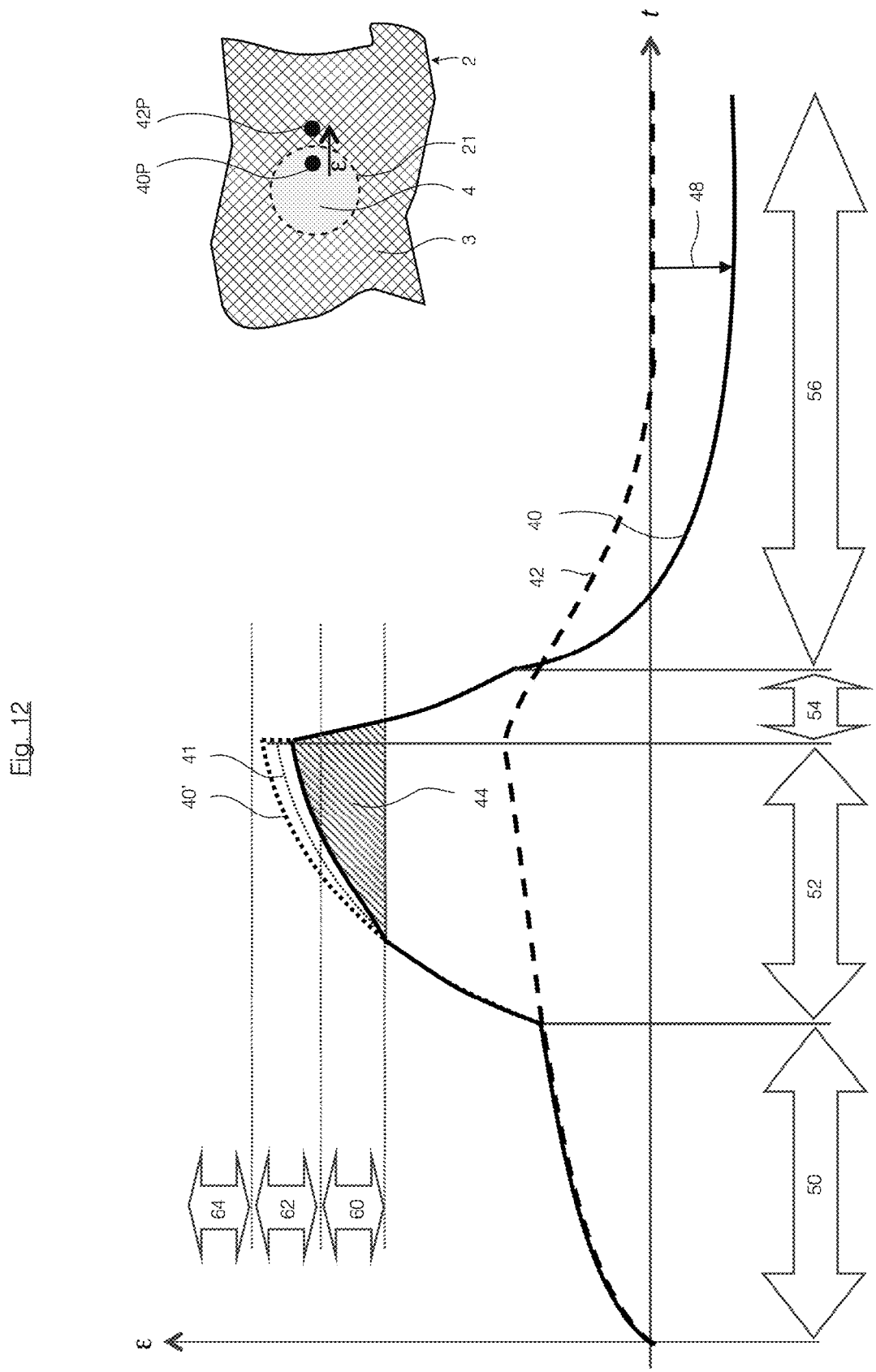
FIG. 12 is a schematic diagram illustrating the relative displacement of two points facing each other across the separation line during the course of an exemplary separation process involving heating in a furnace.

FIG. 12 schematically shows graphs 40, 42 (solid, dashed lines) of a relative displacement E over time t of two points 40P, 42P facing each other across a separation line 21, during an exemplary separation process of a circular inner portion 4 from a main part 3. The relative displacements 40, 42 are indicated in each case with respect to the center of portion 4. Accordingly, the relative displacements 40, 42 correspond to the expansion of portion 4 or of main part 3 during the separation process.

During a first time interval 50, the glass element 2 is heated in a furnace to a furnace temperature (and thus to a surface temperature which is substantially the same over the entire surface). Thereby, the glass element 2 expands as a whole. Accordingly, the two curves 40, 42 are rising similarly during this time interval 50.

During a second time interval 52, only material in the region of portion 4 is then further heated using a laser. Thereby, mostly the material in the region of portion 4 expands. However, main part 3 will also expand by some extent, on the one hand as a direct consequence of the expansion of portion 4, and on the other hand due to (delayed) heating of the main part 3 due to the propagation of heat emanating from portion 4. Accordingly, both curves 40, 42 are rising, with curve 40 rising significantly stronger than curve 42. During a seed formation regime 60, material in the region of the portion begins to crystallize, and during an HQss regime 62, high-quartz solid solution is being formed. (A Kss regime 64 as can be reached at an even higher temperature is not reached in the present example.) Portion 4 is ceramized by this microstructural transformation 44. As a result of the ceramization, however, portion 4 will expand less strongly than would be expected without ceramization (curve 40'). Accordingly, curve 40 bends away from curve 40', which is a typical characteristic of a phase transition. Furthermore, curve 41 shows a process variation with a different course and degree of ceramization.

During a third time interval 54, the laser irradiation of portion 4 is shut off, and portion 4 cools down to the furnace temperature, while the indirectly heated main part 3 also cools down to the furnace temperature.

During a fourth time interval 56, the furnace is also shut off so that it cools down to room temperature, while a gap 48 is being formed along the separation line 21 so that the inner portion 4 can be removed.

Figure 13:
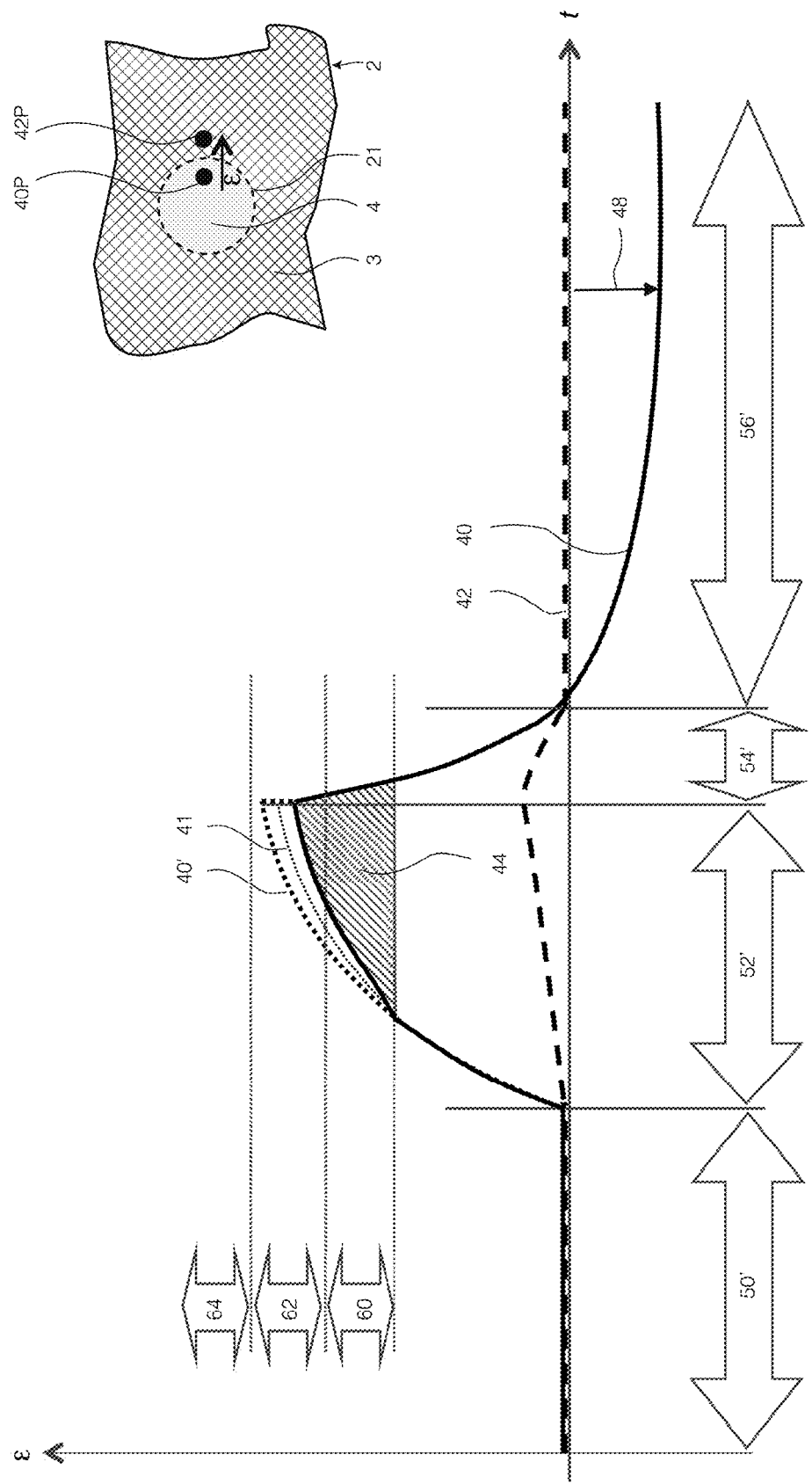
FIG. 13 is a schematic diagram illustrating the relative displacement of two points facing each other across the separation line during the course of an exemplary separation process without heating in a furnace.

FIG. 13, similarly to FIG. 12, shows the relative displacements E of two points 40P, 42P during a standard separation process without heating in a furnace.

In this case, starting from room temperature, for example, material in the region of portion 4 is again heated during a time interval 52' using a laser so as to cause a transformation in microstructure 44 (ceramization). Similarly to the example described in FIG. 12, the ceramization causes a bend in curve 40, i.e. expansion is less than it would be expected without ceramization (curve 40').

During time intervals 54' and 56', the portion 4 is not irradiated by the laser anymore, so that portion 4 and main part 3 are cooling down to the initial temperature, while, again in this case, a gap 48 is being formed along the separation line 21, so that the inner portion 4 can be removed.

With regard to the change in length and in particular the resulting shrinkage of the material during a typical ceramization process, reference is also made here to Bach, Krause (ed.): Low Thermal Expansion Glass Ceramics, Springer-Verlag, 2nd Ed., 2005, page 43. FIG. 2.22 and FIG. 2.23 shown therein (Length variation of Robax® base glass during ceramization with a heating rate of 5K/min) are hereby incorporated by reference. It should be noted that the heating rate is only 5 K/min there, and thus is much lower than in a laser ceramization process.

According to the diagrams described above, it is generally possible with respect to all exemplary embodiments to selectively heat the portion to a temperature range relevant for the ceramization between room temperature and the melting temperature, preferably between 300° C. and the melting temperature, more preferably between 500° C. and the melting temperature. Furthermore, it is in particular contemplated to maintain the temperature in that range for a time interval of at least 10 seconds, preferably at least 25 seconds, more preferably at least 50 seconds. Preferably, as described above, seed forming agents are furthermore present to accelerate ceramization under an appropriate temperature control as described.

What is claimed is:

1. A method for separating a portion from a sheet-like glass or glass ceramic element along a separation line that divides the element into the portion and a main part, comprising:

producing filamentary damages in a volume of the element adjacently aligned along the separation line to define the portion, the filamentary damages being produced by displacing incidence points of a laser pulses of a laser over a surface of the element along the separation line, the element comprising a material transparent for the laser pulses; and subjecting the material of the element located in a region of the portion to a phase transition, the phase transition causing contraction of the material in the region so that the portion detaches from the main part along the separation line with at least the main part remaining intact as a whole.

2. The method of claim 1, wherein the portion remains intact as a whole.

3. The method of claim 1, wherein the phase transition transforms the material in the region to a higher atomic packing factor.

4. The method of claim 1, wherein the phase transition transforms the material in the region to a crystal phase.

5. The method of claim 1, wherein the step of subjecting the material to the phase transition comprises heating the material in the region to a phase transition temperature to initiate the phase transition.

6. The method of claim 1, wherein the region of the portion subjected to the phase transition is distributed in a peripheral zone of the portion, the peripheral zone extending adjacent to the separation line.

7. The method of claim 1, wherein the region of the portion subjected to the phase transition comprises an entirety of the portion.

8. The method of claim 1, further comprising subjecting, after the portion has separated from the main part, the material of the main part to a phase transition into a crystal phase.

9. The method of claim 1, wherein the step of subjecting the material of the element to the phase transition comprises heating the element a surface temperature above room temperature and below a phase transition temperature.

10. The method of claim 1, further comprising displacing, after the filamentary damages have been produced, a point of incidence of a laser radiation on the element along the separation line so as to cause local tensile stresses in the material of the element along the separation line in order to cause formation of cracks between adjacent filamentary damages.

11. The method of claim 1, wherein the element has a thickness of at least 0.5 millimeters.

12. The method of claim 1, wherein the element has a thickness of at least 4 millimeters.

13. The method of claim 1, wherein the separation line divides the element so that the portion assumes a two-dimensional shape in a plane of the element with a maximum dimension of less than 100 millimeters.

14. The method of claim 1, wherein the separation line divides the element so that the portion assumes a two-dimensional shape in a plane of the element that is not star-shaped in a sense of mathematical topology.

15. The method of claim 1, wherein the separation line divides the element so that the main part completely encloses the portion in a plane of the element.

16. The method of claim 1, further comprising producing additional filamentary damages in the volume of the element adjacently aligned along an offset line that is spaced from the separation line by at least 5 and at most 50 micrometers, wherein the additional filamentary damages have a projection onto a longitudinal extension of the filamentary damages that exhibits an overlap of less than 200 micrometers.

17. The method of claim 1, wherein the laser pulses are directed obliquely to the surface so that a direction of light propagation of the laser pulses and, thus, a longitudinal extension of the filamentary damages extends obliquely relative to the surface and so that the separation line extends obliquely to a light incidence plane.

18. The method of claim 1, wherein the main part is configured for use as cooktop panel.

19. The method of claim 18, wherein the separation line, after detaching the portion, defines a cutout area that is configured to receive a cooker exhaust.

20. The method of claim 19, further comprising connecting a tubular cooker exhaust to the element at the cutout area.

\* \* \* \* \*